US009563194B2

(12) United States Patent
Stiernagle et al.

(10) Patent No.: US 9,563,194 B2
(45) Date of Patent: Feb. 7, 2017

(54) RANDOM-ACCESS ROBOTIC INVENTORY DISPENSARY: REPLENISHMENT AND PURGE

(71) Applicant: BBY SOLUTIONS, INC., Richfield, MN (US)

(72) Inventors: Chad Stiernagle, Eagan, MN (US); Glendon T. Kraetsch, Arden Hills, MN (US); Dean R. LaValle, Centerville, MN (US); Cameron P. Sheikholeslami, Minneapolis, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 66 days.

(21) Appl. No.: 14/702,803

(22) Filed: May 4, 2015

(65) Prior Publication Data

US 2016/0327927 A1    Nov. 10, 2016

(51) Int. Cl.
*G06F 7/00* (2006.01)
*G06F 19/00* (2011.01)
*G05B 19/10* (2006.01)

(52) U.S. Cl.
CPC ... *G05B 19/102* (2013.01); *G05B 2219/39106* (2013.01); *G05B 2219/45083* (2013.01)

(58) Field of Classification Search
None
See application file for complete search history.

(56) References Cited

U.S. PATENT DOCUMENTS

| 4,270,319 A | 6/1981 | Spasojevic |
| 4,567,359 A | 1/1986 | Lockwood |
| 4,591,070 A | 5/1986 | Wirstlin |
| 5,206,814 A | 4/1993 | Cahlander et al. |
| 5,544,996 A | 8/1996 | Castaldi et al. |
| 5,595,263 A | 1/1997 | Pignataro |
| 5,822,216 A | 10/1998 | Satchell, Jr. et al. |

(Continued)

FOREIGN PATENT DOCUMENTS

| JP | 61150908 | 7/1986 |
| WO | 2009065145 | 5/2009 |
| WO | 2012019189 | 2/2012 |

OTHER PUBLICATIONS

Apr. 17, 2015 USPTO Office Action (U.S. Appl. No. 13/472,532).

(Continued)

*Primary Examiner* — Yolanda Cumbess
(74) *Attorney, Agent, or Firm* — Schwegman Lundberg & Woessner, P.A.

(57) ABSTRACT

The present invention is a robotic system for maintaining product inventory and dispensing products upon request from a customer or other user. Product items are stored in an inventory storage unit (ISU), one item per bin. Controller logic allows items to be stored in, and retrieved from, arbitrarily-assigned storage locations. The bins hang on rails within drawers. In a replenishment operation, the system transfers empty bins to an operator station for replenishment. An operator fills the empty bins with product items. The system inserts these bins into drawers in the ISU. In a purge operation, the operator enters an identifier of a class of product to be removed. The system moves the bins containing the affected items to the operator station. After the product items are removed, the empty bins are moved to the ISU.

26 Claims, 25 Drawing Sheets

(56) References Cited

U.S. PATENT DOCUMENTS

| | | | |
|---|---|---|---|
| 5,838,566 A | 11/1998 | Conboy et al. |
| 5,927,544 A | 7/1999 | Kanoh et al. |
| 6,059,092 A | 5/2000 | Jerue et al. |
| 6,064,921 A | 5/2000 | Pippin et al. |
| 6,210,093 B1 | 4/2001 | Hannen et al. |
| 6,360,904 B1 | 3/2002 | Schilb et al. |
| 6,393,339 B1 | 5/2002 | Yeadon |
| 6,490,502 B2 | 12/2002 | Fellows et al. |
| 6,584,375 B2 | 6/2003 | Bancroft et al. |
| 6,609,047 B1 | 8/2003 | Lipps |
| 6,688,451 B2 | 2/2004 | Derby et al. |
| 6,962,267 B2 | 11/2005 | Herzog et al. |
| 7,039,495 B1 | 5/2006 | Conboy et al. |
| 7,261,511 B2 | 8/2007 | Felder et al. |
| 7,364,050 B2 | 4/2008 | Guard |
| 7,381,022 B1 | 6/2008 | King |
| 7,621,108 B1 | 11/2009 | Brastauskas et al. |
| 7,780,392 B2 | 8/2010 | Rogers |
| 7,787,681 B2 | 8/2010 | Zhang et al. |
| 7,809,470 B2 | 10/2010 | Shoenfeld |
| 7,896,243 B2 | 3/2011 | Herskovitz |
| 7,988,015 B2 | 8/2011 | Mason, II et al. |
| 8,092,140 B2 | 1/2012 | Baker et al. |
| 8,140,187 B2 | 3/2012 | Campbell et al. |
| 8,162,174 B2 | 4/2012 | Hieb et al. |
| 8,204,624 B2 | 6/2012 | Zini et al. |
| 8,239,062 B2 | 8/2012 | Vahlberg et al. |
| 8,281,553 B2 | 10/2012 | Kim |
| 8,308,414 B2 | 11/2012 | Schifman et al. |
| 8,403,614 B2 | 3/2013 | Bastian, II et al. |
| 8,417,380 B2 | 4/2013 | Kuehnrich et al. |
| 8,494,672 B2 | 7/2013 | Chirnomas |
| 8,494,673 B2 | 7/2013 | Miranda et al. |
| 8,571,700 B2 | 10/2013 | Keller et al. |
| 8,571,701 B2 | 10/2013 | Lunak et al. |
| 8,571,708 B2 | 10/2013 | Rob et al. |
| 8,620,472 B2 | 12/2013 | Mockus et al. |
| 8,632,294 B2 | 1/2014 | Subotincic |
| 8,678,232 B2 | 3/2014 | Mockus et al. |
| 8,695,814 B2 | 4/2014 | Van Ooyen et al. |
| 8,705,388 B2 | 4/2014 | Gong et al. |
| 8,706,293 B2 | 4/2014 | Lu |
| 8,712,586 B2 | 4/2014 | Allinson |
| 8,738,177 B2 | 5/2014 | Van Ooyen et al. |
| 8,768,789 B2 | 7/2014 | Smith et al. |
| 8,972,045 B1 | 3/2015 | Mountz et al. |
| 9,333,649 B1 | 5/2016 | Bradski et al. |
| 2003/0216969 A1 | 11/2003 | Bauer et al. |
| 2004/0188523 A1 | 9/2004 | Lunak et al. |
| 2005/0055361 A1 | 3/2005 | Deal |
| 2005/0063801 A1 | 3/2005 | Durand et al. |
| 2005/0216120 A1 | 9/2005 | Rosenberg et al. |
| 2005/0238465 A1 | 10/2005 | Razumov |
| 2007/0071585 A1 | 3/2007 | Henkel |
| 2007/0135965 A1 | 6/2007 | Nguyen et al. |
| 2007/0284442 A1 | 12/2007 | Herskovitz |
| 2008/0008568 A1 | 1/2008 | Harris et al. |
| 2008/0284139 A1 | 11/2008 | Shockley |
| 2009/0164328 A1 | 6/2009 | Bishop et al. |
| 2010/0138037 A1 | 6/2010 | Adelberg et al. |
| 2011/0071928 A1 | 3/2011 | Young |
| 2011/0118855 A1 | 5/2011 | Hosek et al. |
| 2011/0229296 A1 | 9/2011 | van Ooyen et al. |
| 2012/0029685 A1 | 2/2012 | Keller et al. |
| 2012/0029687 A1 | 2/2012 | Hagen et al. |
| 2012/0033209 A1 | 2/2012 | Osterkamp et al. |
| 2012/0101627 A1 | 4/2012 | Lert |
| 2012/0104785 A1 | 5/2012 | Hixson et al. |
| 2012/0219397 A1 | 8/2012 | Baker |
| 2012/0298688 A1 | 11/2012 | Stiernagle |
| 2013/0123978 A1 | 5/2013 | Stark |
| 2013/0253700 A1 | 9/2013 | Carson |
| 2013/0297066 A1 | 11/2013 | Alvern |
| 2014/0052498 A1 | 2/2014 | Marshall et al. |
| 2014/0144470 A1 | 5/2014 | Sewell et al. |
| 2014/0212250 A1 | 7/2014 | Walter |
| 2015/0073589 A1 | 3/2015 | Khodl et al. |
| 2016/0140488 A1* | 5/2016 | Lindbo ................ B65G 1/1373 |
| | | | 705/28 |

OTHER PUBLICATIONS

Enterprise Efficiency, Robotic Grocery Stores Pop Up Nationwide, Apr. 5, 2012.
Lancaster Newspapers, Inc., Clerk? What's a clerk? Oct. 31, 2002.
Murray, Charles J., Now There's a Robot, Design News, Mar. 26, 1990, p. 78 (and related pictures).
Shelf Plus, The End of Separation: Man and Robot as Collaborative Coworkers on the Factory Floor, Aug. 8, 2013.
The Blade, Kroger debuts kiosk concept at area college campus, Feb. 15, 2012.
The Robot Report, Everything-Robotic, Oct. 2, 2012.
Wikipedia, Automatic Retail Selling Device and Method of Operation Therefore, May 22, 2009.
"U.S. Appl. No. 14/702,827, Preliminary Amendment filed Jan. 27, 2016", 9 pgs.
"International Application Serial No. PCT/US2016/019590, International Search Report mailed Jul. 6, 2016", 4 pgs.
"International Application Serial No. PCT/US2016/019590, Written Opinion mailed Jul. 6, 2016", 14 pgs.
"International Application Serial No. PCT/US2016/019590,Invitation to Pay Additional Fees and Partial Search Report mailed Apr. 15, 2016", 2 pgs.
"U.S. Appl. No. 14/702,813, Non Final Office Action mailed Oct. 6, 2016", 8 pgs.
"U.S. Appl. No. 14/702,813, Preliminary Amendment filed Jan. 28, 2016", 10 pgs.
"U.S. Appl. No. 14/702,827, Response filed Oct. 11, 2016 to Restriction Requirement mailed Sep. 21, 2016", 9 pgs.
"U.S. Appl. No. 14/702,827, Restriction Requirement mailed Sep. 21, 2016", 7 pgs.
U.S. Appl. No. 14/702,813, filed May 4, 2015, Random-Access Robotic Inventory Dispensary: Multi-Pick Fulfillment.
U.S. Appl. No. 14/702,827, filed May 4, 2015, Random-Access Robotic Inventory Dispensary: Variable Bin Height.
U.S. Appl. No. 15/012,525, filed Feb. 1, 2016, Random-Access Robotic Inventory Dispensary: Operation Prioritization.

* cited by examiner

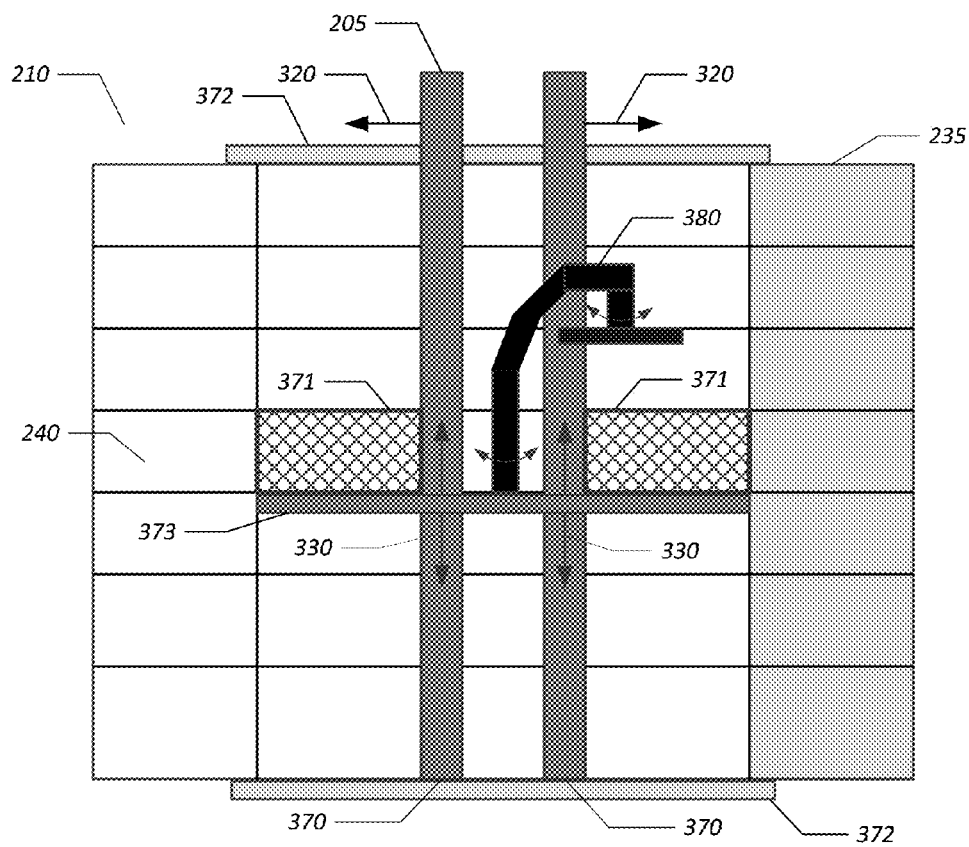
FIG. 3a
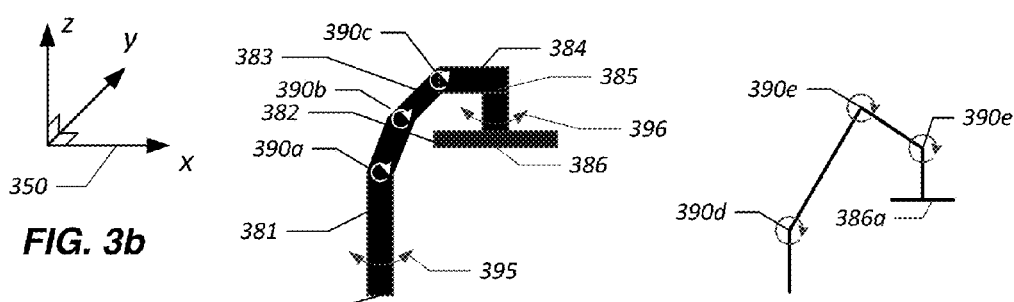
FIG. 3b
FIG. 3c
FIG. 3d

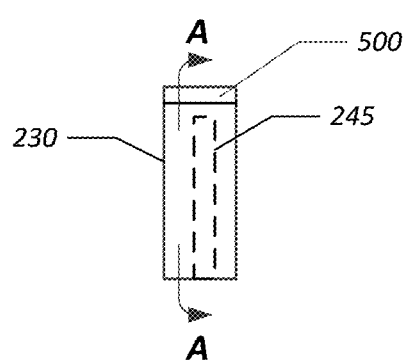
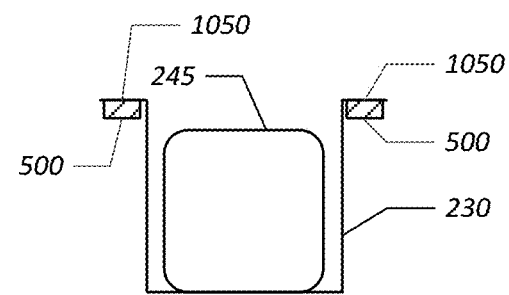
FIG. 10a    FIG. 10b
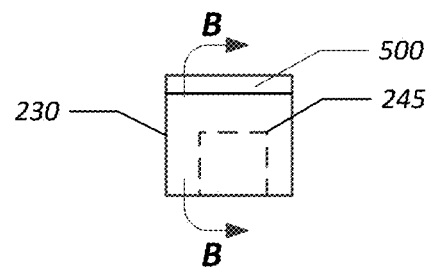
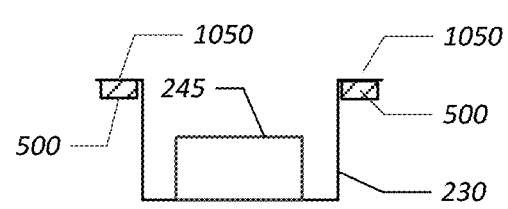
FIG. 11a    FIG. 11b

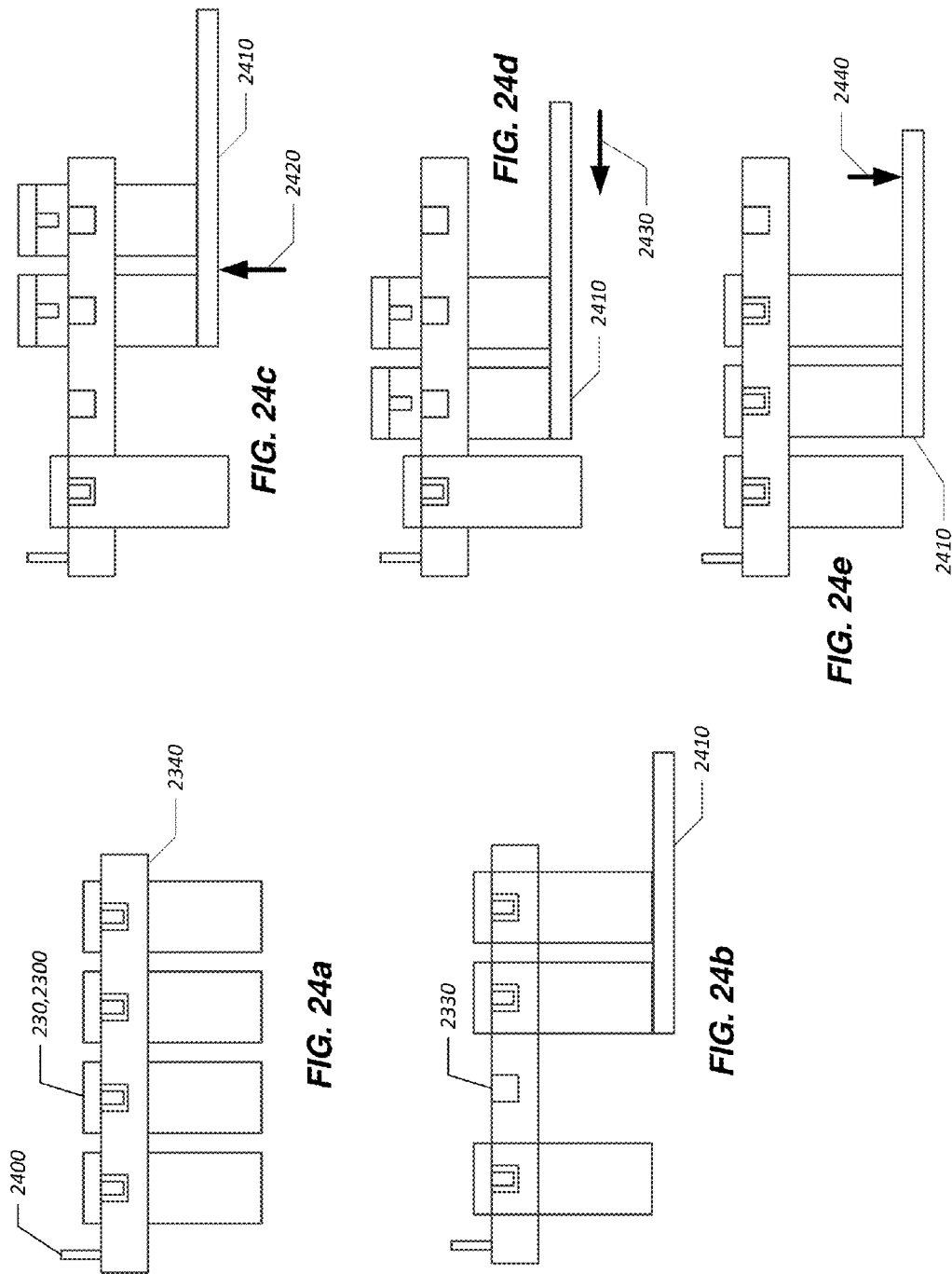

RANDOM-ACCESS ROBOTIC INVENTORY DISPENSARY: REPLENISHMENT AND PURGE

CROSS-REFERENCES TO RELATED APPLICATIONS

This application is related to U.S. application Ser. No. 14/702,827, filed May 4, 2015, titled "Random-Access Robotic Inventory Dispensary: Variable Bin Height". This application is related to U.S. application Ser. No. 14/702,813, filed May 4, 2015, and titled "Random-Access Robotic Inventory Dispensary: Multi-Pick Fulfillment", Both of these applications are hereby incorporated by reference in their entirety.

FIELD OF THE INVENTION

The present invention relates to a random-access robot-implemented inventory storage and dispensary system. Specifically, it relates to replenishment and purge functionality in such a system.

BACKGROUND OF THE INVENTION

A "user interface" (UI) allows a user to interact with a computer or processing system. A UI may contain a display, tactile controls, or peripheral devices (e.g., mouse, touch pad, joystick) to facilitate entering data and making selections. The processing system, under control of one or more computer processors, might provide a graphical UI (GUI) though the display. A GUI might or might not include touch controls.

A "database" stores and organizes data in any number of file structures and tangible computer-accessible storage devices, in any format. A "database system" (and, indeed, a database) may be hierarchical, and include one or more databases, possibly of a variety of different contents, types, formats, and access means. For example, a database in a database system might be a relational database, an object-oriented database, a flat text file, or a collection of images or audio/video tracks.

By "logic" we mean hardware, and software instructions executing on that hardware, that executes instructions, makes decisions, and initiates actions.

A "robot" is an apparatus or system that performs physical tasks under control of a processing system or controller, which executes controller logic. Note that two robots, each with separate controllers, may be under common supervision or direction by a single controller. This combination of robots may be regarded as a single robot. Similarly, if robot A directs robot B, the combination of A and B may be regarded as itself a robot. In some instances, to emphasize that two or more robots might be involved, we may use the term "robotic system" rather than "robot."

A "scanning system" consists of one or more scanners acting under a common control. Each scanner in the system has a respective scanning technology, scans specific types of objects, and obtains from those objects specific types of information. Between any two scanners in the system, the technologies used may be the same or different; the types of objects may be the same or different; and the types of information may be the same or different. A scanning system might or might not be part of a robotic system.

A "product item" is an individual instance of a product model. A "product type" is a set of product items having something in common. The following are exemplary product types: all product items of a given model or stock-keeping unit (SKU); all product items from a given manufacturer; all product items from a given supplier; all product items having a given functionality (e.g., video cameras); all product items of a given model having a particular color; all product items of a given variety (e.g., freeze-dried strawberries) and shelf-life or sell-by date; a set of individually-identified product items.

Herein, we will regard the terms "replenish" and "restock" as synonyms.

SUMMARY OF THE INVENTION

The present invention is a robotic inventory dispensary (RID); that is, a robotic system for maintaining product inventory and dispensing products upon request from an "RID-consumer" or "consumer." In a retail environment, a consumer might be a customer, a staff member, another automated system, or an operator of the RID. Product items are stored in an inventory storage unit (ISU), one item per bin. Controller logic allows product items to be stored in, and retrieved from, arbitrarily-assigned storage locations. Because contents of any storage location in the RID can be accessed by the robot directly at any time, the RID is random-access. Such access may include, for example, coupling to (e.g., magnetically) and removing any bin from the RID; removing a product item from a bin; inserting a bin into the RID; transferring a bin from one location in the ISU to another; transferring a product item from a bin from ISU to a dispensing apparatus (e.g., a dispensing chute, a conveyor, or an operator access drawer); transferring a bin from an operator access device into the ISU; and compressing any storage area within the ISU where bins are stored.

The RID may include a set of prioritization modules in a storage prioritization scheme, and allow the currently-active module to be changed to another modules, or parameters constraining the currently-active module to be set or modified through a UI or by controller logic. A prioritization scheme governs the relative priority attached by the robot to sequence tasks it is required to perform.

Bins in the ISU hang on rails arranged as drawers. In a replenishment operation, the system transfers empty bins to an operator station for replenishment. An "RID-operator" or "operator" fills the empty bins with product items. The system inserts these bins into drawers of the ISU. In a purge operation, the operator enters an identifier of a product type to be removed. The system moves the bins containing the affected items to the operator station. After the product items are removed, the empty bins are moved back into the ISU.

Some embodiments allow bins to have variable heights. Configuration of the rails may facilitate such bins of variable height. Vertical movement of the rails may be automated.

Some embodiments allow multiple product items to be picked from the storage by the robot before any of them are dispensed. In such embodiments, upon a request from a consumer for a plurality of product items, the robot retrieves a bin holding the first item from the ISU, and places the bin onto a shelf or other temporary storage that moves with the robot. The additional items are handled similarly. Once all the requested product items are in temporary storage, the robot transfers them to a dispensing chute to the consumer.

BRIEF DESCRIPTION OF THE DRAWINGS

FIG. 3a is a front view of an inventory storage unit (ISU) and a robot of an exemplary RID.

FIG. 3b is a Cartesian coordinate system that is helpful in describing a RID. The previous figure is viewed in the y direction.

FIG. 3c is a break-out showing the structure of an exemplary arm of a robot.

FIG. 3d is a stick diagram illustrating an alternative arrangement of tilt axes for an arm of a robot.

FIG. 10a is a side view of a first exemplary ISU bin that contains a product item.

FIG. 10b is a front cross-section at A-A through the ISU bin of the previous figure.

FIG. 11a is a side view of a second exemplary ISU bin that contains a product item.

FIG. 11b is a front cross-section at B-B of the ISU bin of the previous figure.

FIG. 24a is the first view in a sequence illustrating rack compression or squeezing with pin-mounted bins.

FIG. 24b is the second view in a sequence illustrating rack compression or squeezing with pin-mounted bins.

FIG. 24c is the third view in a sequence illustrating rack compression or squeezing with pin-mounted bins.

FIG. 24d is the fourth view in a sequence illustrating rack compression or squeezing with pin-mounted bins.

FIG. 24e is the fifth view in a sequence illustrating rack compression or squeezing with pin-mounted bins.

DETAILED DESCRIPTION OF EXEMPLARY EMBODIMENTS

This description provides embodiments of the invention intended as exemplary applications. The reader of ordinary skill in the art will realize that the invention has broader scope than the particular examples described here. It should be noted from the outset that the drawings, and the elements depicted by the drawings, are not necessarily to scale and may not show all details. Elements displayed in drawings may be confined to ones deemed relevant to the scope of illustrative embodiments.

Figure 1:
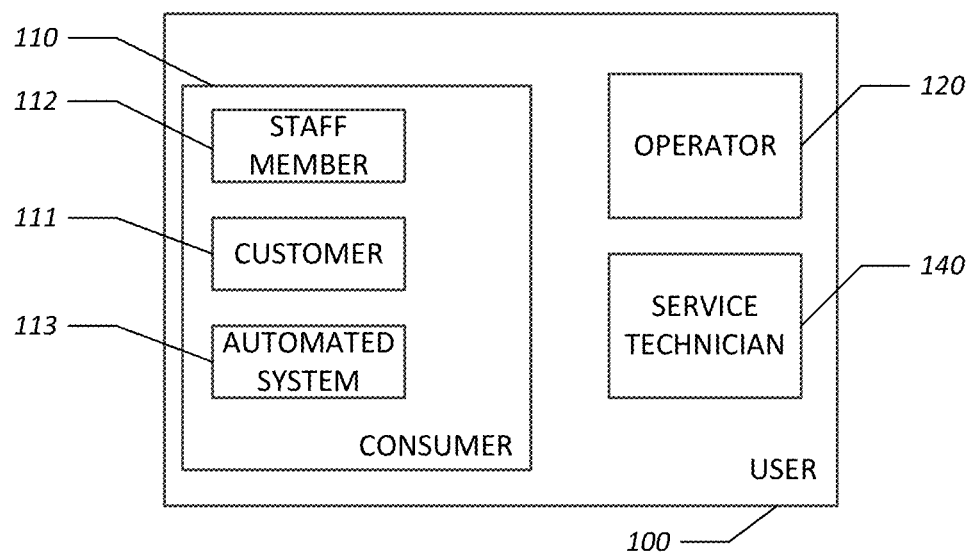
FIG. 1 is a block diagram illustrating categories of users of an exemplary robotic inventory dispensary (RID).

A robotic inventory dispensary (RID) 200 stores and dispenses product items 245 to consumers 110. As summarized by FIG. 1, a user 100 of an RID 200 is a person who has access to an RID 200 under normal operations. A user 100 might be a consumer 110, an operator 120, or a service technician 140. An operator 120 might handle manual aspects of product replenishment or purge. A service technician 140 might access the RID 200 for testing, upgrade, or repairs. We use the term "consumer" not in the economic sense, but rather as a consumer of the primary function of an RID 200; namely, dispensing product items 245 on demand. A consumer 110 might be a staff member 112 or a customer 111. A consumer 110 might also be another automated system 113. A staff member 112 might be, for example, a person who fulfills orders within a retail store or a distribution center (DC). A person might be a user 100 both as an operator 120 and as a staff member 112. An RID 200 may dispense product items 245 directly to customers 111 in a store. In some embodiments or implementations, an operator 120 might also be a consumer 110.

Figure 2:
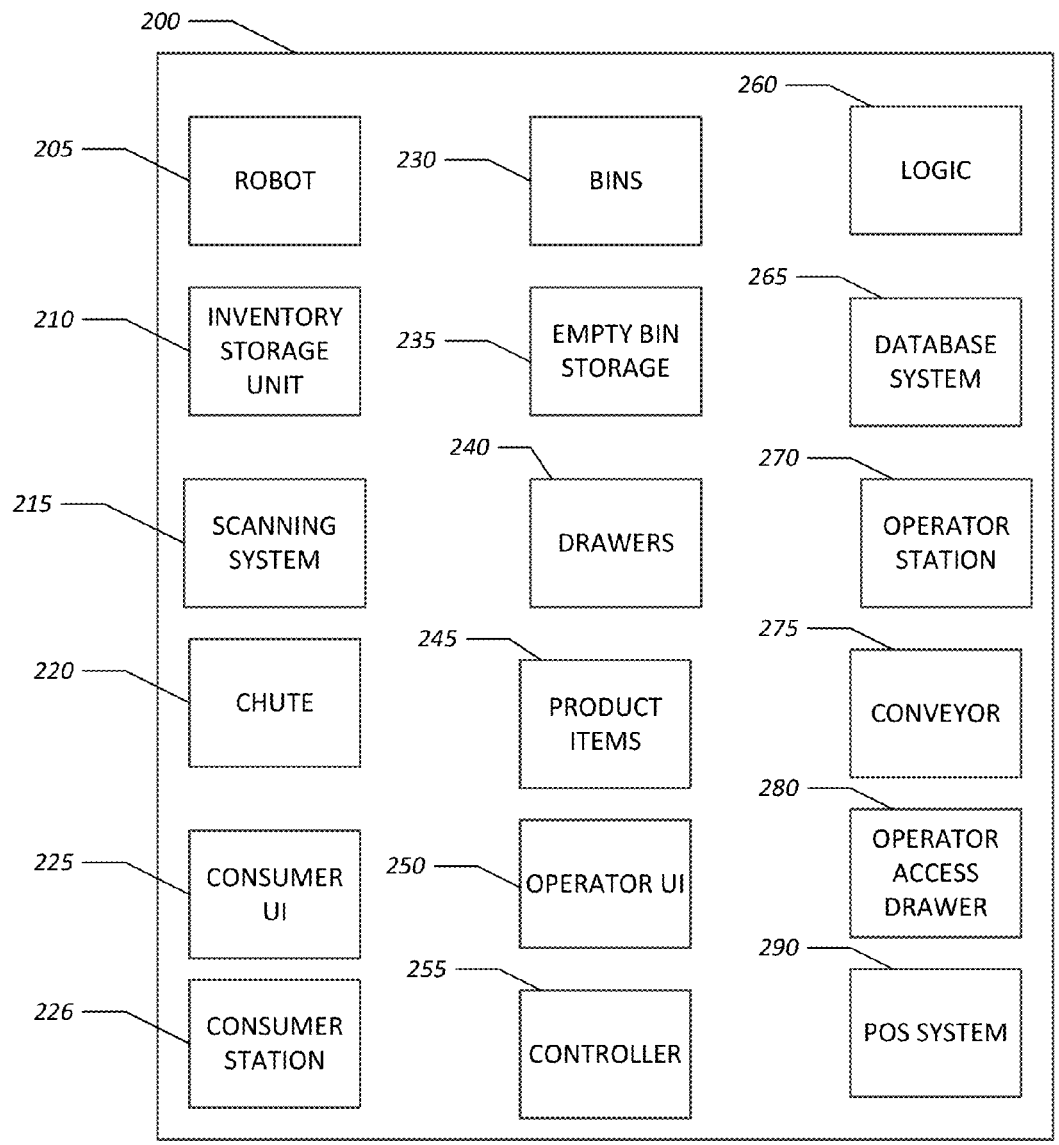
FIG. 2 is a block diagram illustrating functional and structural components of an exemplary RID.

FIG. 2 is a block diagram illustrating functional and structural components of an exemplary robotic inventory dispensary (RID) 200. An ISU 210 stores product items 245 under the management of a controller 255. The ISU 210 of an RID 200 might have one or more modular units or housings; one or more robots 205; access by one mechanism or several mechanisms, or one or more locations. For example, an RID 200 might dispense product items 245 to customers 111, but also dispense product items 245 to staff members 112 using a different robot 205 and at a different location, possibly in a backroom of a store. The RID 200 might have dispensing chutes 220 at multiple locations; for example, a chute 220 in front of an ISU 210 for customers and another behind the ISU 210 for staff members 112. There may also be a chute 220 for dispensing product items 245 to an operator 120.

An operator 120 might manually add or remove product items 245 from an RID 200 through an operator access system at an operator station 270. Access by the operator 120 to product items 245 might be by a conveyor 275, or by an operator access drawer (OAD) 280, or both. There may be more than one OAD 280 to improve efficiency. During replenishment, for example, the robot 205 might be removing already filled bins 230 from one OAD 280 while the operator 120 fills bins 230 in another. The conveyor 275 and the OAD 280 are examples of operator-access devices, which give an operator 120 access to bins 230 for manual tasks.

The controller 255, executing logic 260, manages equipment and maintains data necessary to carry out tasks of the RID 200. The data is saved in, and accessed from, a database system 265.

RIDs 200 can vary in prioritization of goals for their organization. For example, a given system might be prioritized to keep all product items 245 of a given model in the same area of an ISU 210. Another system might seek primarily to minimize empty space in the ISU 210. prioritization schemes 975 that minimize the time to respond to a request from a consumer 110, balancing replenishment/purge operations and space utilization, will be discussed in connection with FIGS. 14a and 14b.

The controller 255 of an RID 200 can preferably handle any and all of these prioritization schemes 975. To achieve this, a controller 255 will preferably execute logic, and maintain data in the database system 265, to allow a single product item 245 to be stored in, and removed from, any given location within the ISU 210. In other words, the RID 200 is a random-access storage system. The RID 200 may use a scanning system 215, including one or more scanners, to identify bins 230 and product items 245.

Priorities for the RID 200 may evolve over time due to empirical experience or changing circumstances. Such new priorities might be implemented by merely changing the prioritization scheme 975. An RID 200 might have several built-in prioritization modules, and a given prioritization module might have a changeable options or parameters that constrain how prioritization is done. An operator 120 might be able to change a prioritization module or a prioritization parameter though the operator UI 250. Because a priority module might be configured by changing parameter values, or replaced with another prioritization module, on operator command, the same ISU 210 can therefore be used for many different purposes and in many different contexts.

Preferably, a prioritization scheme will be selected so that product items 245 of a given model will be removed on a first-in first-out (FIFO) basis. The FIFO approach seeks to achieve a relatively uniform ISU 210 residence for a product model. Other schemes, such as last-in first-out (LIFO), are also with scope of embodiments. For example, a prioritization scheme 975 might prioritize minimization of retrieval time, without regard to shelf life. In this prioritization scheme 975, a robot 205 might simply grab (i.e., couple to and lift) the product item 245 closest to the current position of its hand 386.

Within the ISU 210, product items 245 may be stored in bins 230, preferably one product item 245 per bin 230. The bins 230 may be organized into drawers 240 in the ISU 210. A drawer 240 may be a frame structure, or it might have one or more solid sides. A drawer 240 may open into a tray 371, giving the robot 205 access to its contents. A shelf 373 of the robot 205 will preferably include two such trays 371, left and right, but other numbers of trays 371 are possible. The trays 371 are examples of temporary bin-holding receptacles. The ISU 210 may include a section (e.g., a column 410) of empty bin storage 235 reserved for empty bins 230. The controller 255 commands one or more robots 205 as its agents to move bins 230 and product items 245 throughout the RID 200 as needed to implement the tasks of the controller 255.

The robot 205 may move bins 230 to/from a conveyor 275. The conveyor 275 may be used to transport bins 230 between an operator station 270, where an operator 120 has access to bins 230 to assist in replenishment/purge operations regarding product items 245 in the RID 200. The operator station 270 may include an operator UI 250 whereby the operator 120 can interact with the controller 255 by entering data and instructions, and by receiving information.

An RID 200 may have an OAD 280. An OAD 280 might be used for replenishment and purge, initiated by an operator 120, or for dispensing of product items 245 to a staff member 112. A given RID 200 might have zero or more conveyors 275 and zero or more OADs 280, in any combination. Preferably, when an OAD 280 is opened, it projects out from a side of the ISU 210, giving access to the operator 120 to insert bins 230 or product items 245, and to remove bins 230 or product items 245. When the OAD 280 is closed, it behaves as a drawer 240 of the ISU 210, giving the robot 205 access to the OAD 280 and its contents.

The RID 200 may include a consumer UI 225 in a consumer station 226, whereby a consumer 110 may request a product item 245. A first consumer UI 225 might dispense product items 245 to customers 111; a second consumer UI 225, to staff members 112. A robot 205 may transfer the product item 245 to a chute 220 for dispensing it to a consumer 110. An RID 200 may also include a chute 220 that dispenses product items 245 into the operator station 270 for an operator 120.

In some embodiments, the consumer UI 225 might act as, in effect, a smart vending machine. The consumer UI 225 might include a Point-of-sale (POS) system 290, requiring payment before a product item 245 is delivered to the consumer 110. Such a consumer UI 225 may accept various forms of payment, such as cash, credit card, or smart phone account scanning. Alternatively, the product items 245 might be first delivered to the consumer 110 without up-front payment. The consumer 110 might then take the items to a separate POS station for payment and checkout. This approach might be appropriate where a store's inventory is split between an RID 200 and more traditional retail display units, such as shelves, racks, and counters.

In the case of a DC, no payment may be required at the consumer UI 225. However, some form of identification might be required by the consumer UI 225 of a staff member 112 requesting product items 245, in order to track product items 245 and to maintain accountability.

FIG. 3*a* is a front view of a robot 205 and an ISU 210 of an exemplary RID 200. FIG. 3*b* is a Cartesian coordinate system 350 that is helpful in describing an RID 200. FIG. 3*a* is viewed in the y direction. This particular ISU 210 is arranged into a module that is a grid five drawers 240 wide and seven drawers 240 high. The rightmost column 410 is reserved for empty bin storage 235, and is shown shaded. If product items 245 are marked with optical-type identifiers (IDs), such as a barcode or 2D barcode, then bins 230 will preferably be transparent, or translucent, on all sides. Preferably the ISU 210 will have a rigid structure and have essentially the shape of a rectangular solid.

A robot 205 accesses drawers 240 in the ISU 210, and bins 230 within the drawers 240. The illustrated robot 205 has an articulated arm 380. In the illustrated embodiment, the arm 380 can swivel, tilt, and bend; a hand of the arm can couple to, lift, and move bins 230. The robot 205 has a shelf 373 onto which it can slide out up to two drawers 240 into trays 371 on either side of the arm 380 in order to insert, remove, rearrange, or compress bins 230 within a drawer 240. The shelf 373 can move vertically along one or more posts 370 as indicated by arrows 330; the robot 205 illustrated in FIG. 3*a* has two posts 370. The posts 370 move left/right along one or more tracks 372, as indicated by arrows 320; the robot 205 illustrated in FIG. 3*a* has a track 372 at the top and another at the bottom, but other arrangements for horizontal movement are possible.

FIG. 3*c* is a breakout from FIG. 3*a* that shows more detail of an exemplary arm 380. This arm 380 has a base 381 that can swivel as indicated by arrow 395. The arm 380 may have a top segment 384 from which a grabber or hand 386 is suspended; in this case, by segment 385. The hand 386 can grab, lift, and translate bins 230, and can open and close drawers 240. The base 381 and top segment 384 of the arm 380 are connected by segment 382 and segment 383. These segments can tilt relative to each other and also relative to base 381 and segment 384, as indicated by arrows 390*a*, 390*b*, and 390*c*. Thus, arm 380 can swivel, bend, and tilt to give the hand 386, which can itself rotate as indicated by arrow 396, a wide range of positions and orientations. The arm 380 might also have an extensible or telescopic segment (not shown)—e.g., in base 381—that allows it to move vertically. In FIG. 3*a*, the arm 380 moves vertically along with shelf 373. Of course, other configurations of a robot 205 and, in particular, of an arm 380, can provide similar functionality and are within the inventive scope. In such other embodiments, the robot 205 can still be capable of random access to individual bins 230 containing product items 245.

FIG. 3*d* is a stick diagram showing an alternative arrangement of tilt axes 390*a*, 390*b*, and 390*c* for a hand 386*a* of a robot 205.

The horizontal and vertical motion of the shelf 373 and arm 380 may be handled by a robot that is separate from the robot 205 that opens drawers 240 and moves bins 230. However, both robots 205 are under common control of a controller 255, and so may be considered a single robot or robotic system.

Figure 4:
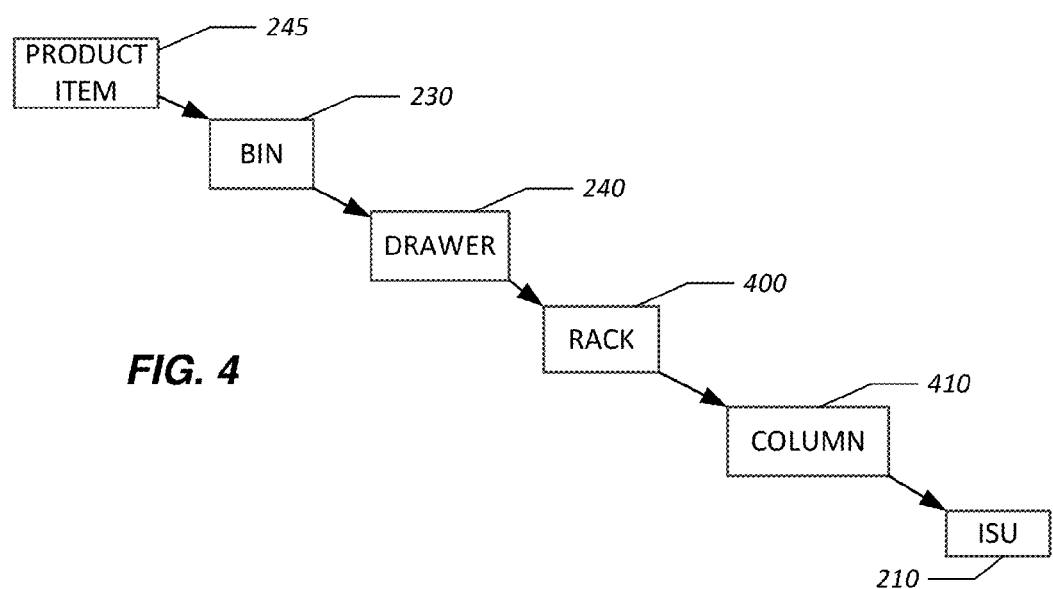
FIG. 4 is a conceptual diagram illustrating an exemplary storage hierarchy in an ISU.

FIG. 4 is a conceptual diagram illustrating an exemplary storage hierarchy in an ISU 210. The ISU 210 is organized into vertical columns 410. The drawers 240 are supported by racks 400 arranged in the columns 410, as shown in more detail in FIGS. 12*a*, 12*b*, 13*a*, and 13*b*. The drawers 240 may be extended onto the shelf 373—e.g., into trays 371—to give the arm 380 access. Bearings or rollers (not shown) or other similar mechanism may facilitate such extension. The robot 205 may open and close drawers 240 by pulling or pushing handles on either side of a drawer 240, proximate to the end of the drawer 240. The bins 230 may hang from two rails 500 of a drawer 240 by a lip structure, in a manner similar to well-known hanging file folders. Alternatively, the bins 230 may have downward-extending pins that mate with holes in the rails 500, thereby ensuring proper alignment. The robot 205 may use the pins 2320 to lift a bin 230, possibly by magnetic attraction between the hand 386 and the pins 2320. The bins 230 may have variable depths and/or heights. A bin 230 may be empty, or may hold a product item 245.

Figure 5B:
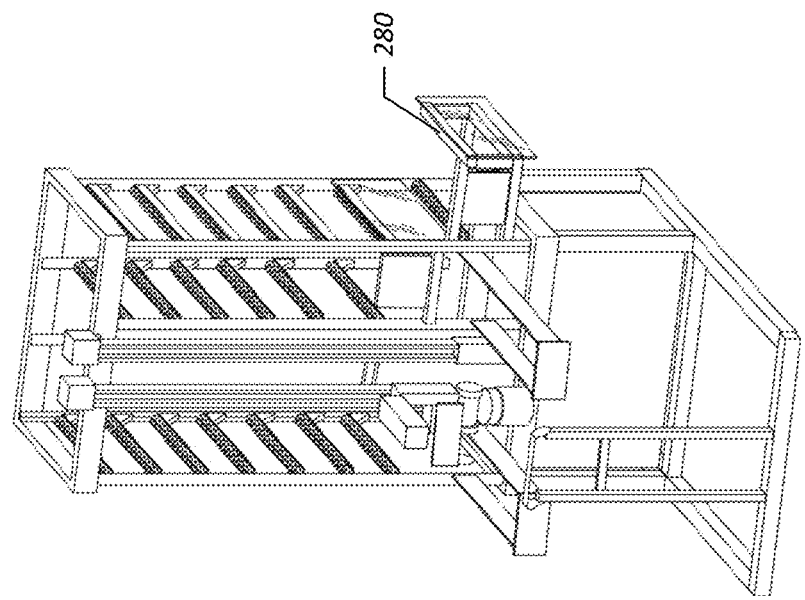
FIG. 5b is an isometric view of an exemplary RID having an operator access drawer.
Figure 5A:
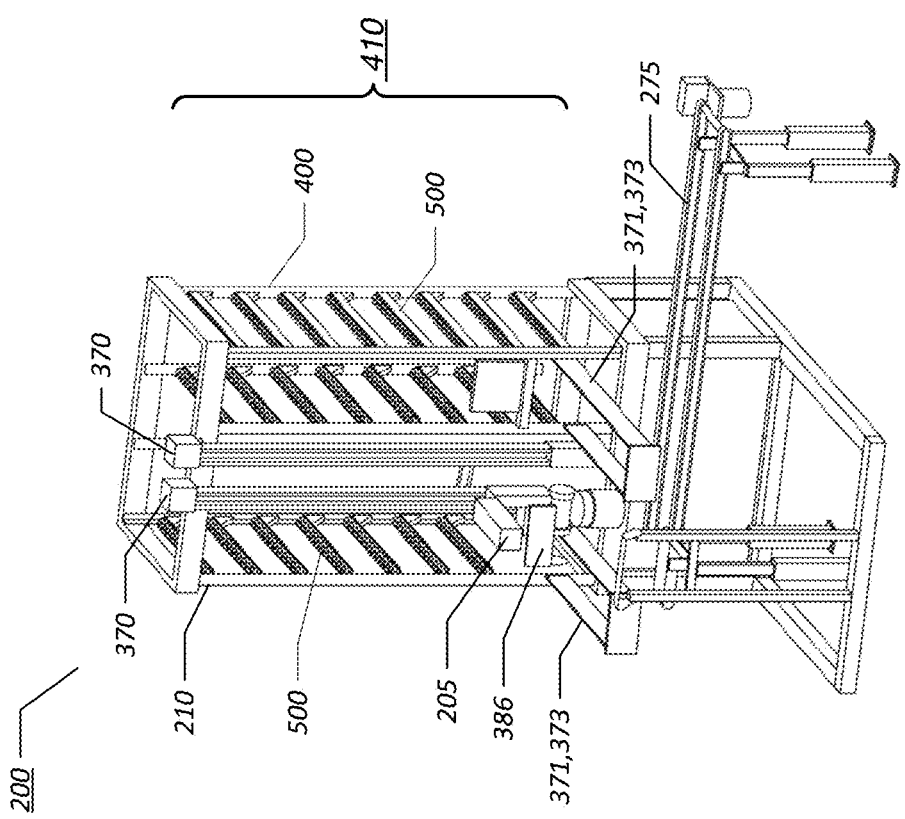
FIG. 5a is an isometric view of an exemplary RID using a conveyor for operator access.

FIG. 5*a* is an isometric view of an exemplary RID 200 using a conveyor 275 for operator access. In addition to examples of many of the components of an RID 200 already described, the figure shows rails 500 upon which bins 230 rest in the ISU 210. FIG. 5*b* is an isometric view of an exemplary RID 200 having an OAD 280 instead of a conveyor 275 for operator 120 access. In the embodiment shown, the operator 120 has access to the contents (i.e., bins 230, either empty or containing product items 245) when the OAD 280 is open; when the OAD 280 is pushed closed, the OAD 280 behaves like other drawers 240 in the ISU 210 to which the robot 205 has access.

Figure 6:
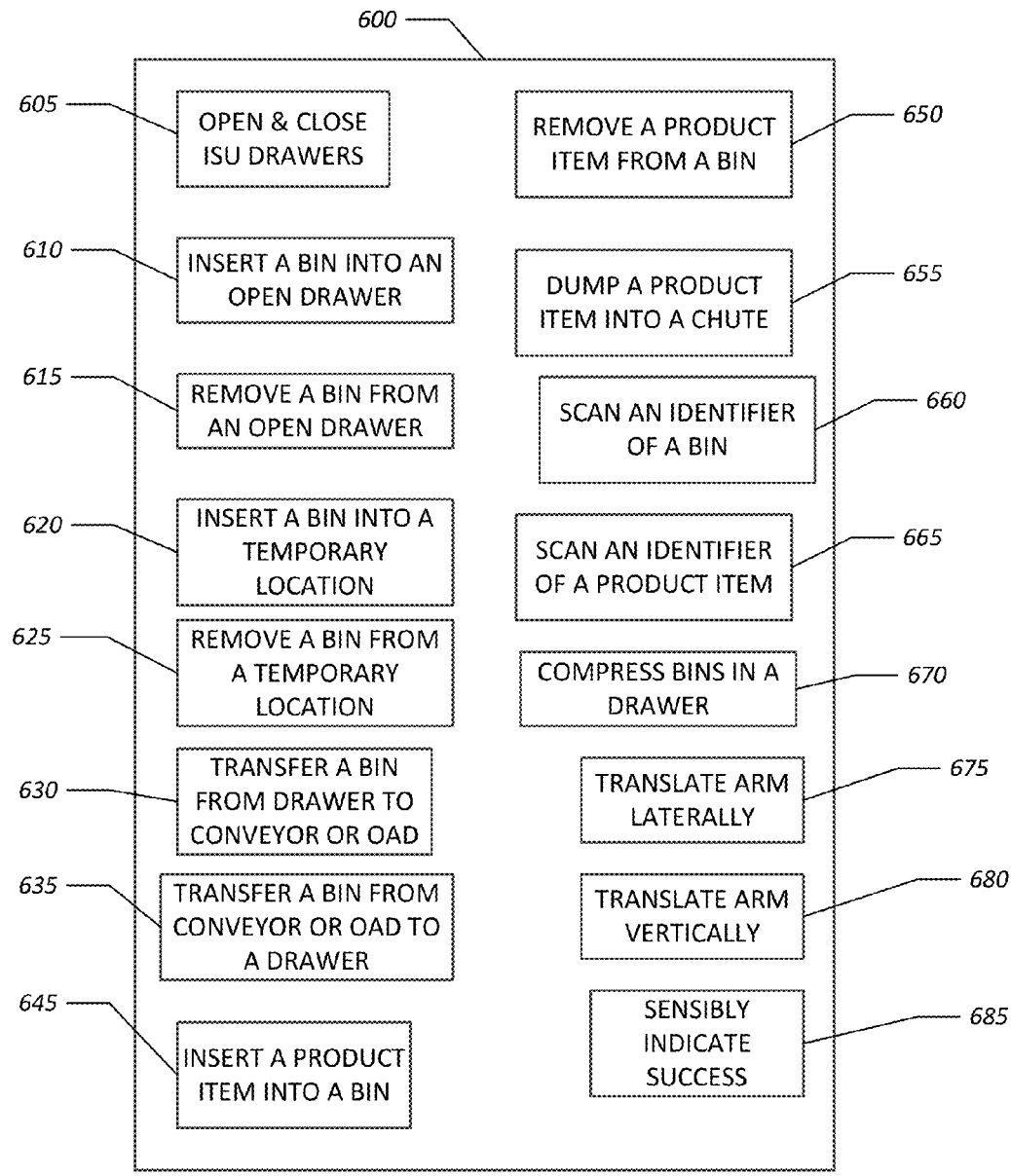
FIG. 6 is a block diagram illustrating exemplary tasks that might be executed by a robot in a RID.

FIG. 6 is a block diagram illustrating exemplary tasks 600, some or all of which that might be executed by a robot 205 in an RID 200. These include: open and close 605 the drawers 240; insert 610 a bin 230 into an open drawer 240; remove 615 a bin 230 from an open drawer 240; insert 620 a bin 230 into a temporary location, such as empty bin storage 235; remove 625 a bin 230 from a temporary location; transfer 630 a bin 230 from a drawer 240 to a conveyor 275 or to an OAD 280; transfer 635 a bin 230 from a conveyor 275 or an OAD 280 to a drawer 240; insert 645 a product item 245 into a bin 230; remove 650 a product item 245 from a bin 230; dump 655 a product item 245 into a chute 220 to be dispensed to a consumer 110; scan 660 an identifier of a bin 230; scan 665 an identifier (e.g., a UPC) of a product item 245; compress 670 the bins 230 in a drawer 240; translate 675 the arm 380 laterally; translate 680 the arm 380 vertically; and sensibly indicate 685 success of an operation. As an example of this last task, an audio signal, a visual signal on a UI, or even an action by the robot 205 (e.g., a victory dance) might be used to indicate that an operation, such as dispensing several product items 245 to a consumer 110, is complete.

Figure 7:
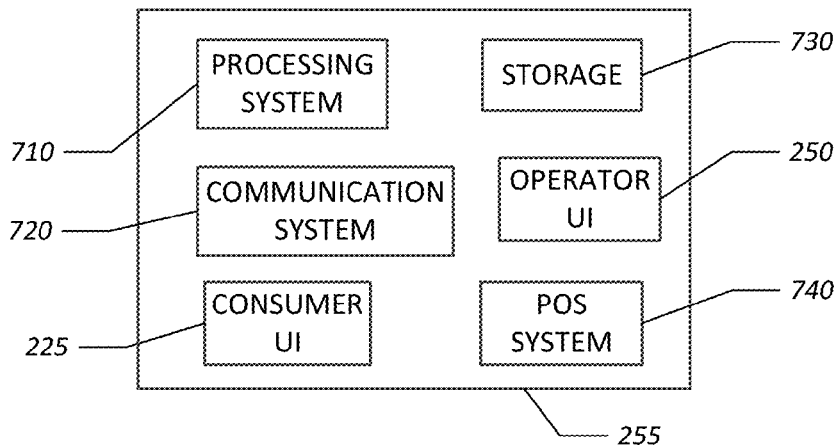
FIG. 7 is a block diagram illustrating exemplary functional and structural components of a controller of a RID.

FIG. 7 is a block diagram illustrating exemplary functional and structural components of a controller 255 of an RID 200. Note that the controller 255 may be located in the robot 205, elsewhere in the RID 200, or might remotely and access the RID 200 over a communication system 720 through a network connection. The functionality may be divided among systems and locations. The controller 255 includes a processing system 710 that includes at least one processor, and storage 730 that includes computer-accessible tangible storage. An operator 120 might interact with controller 255 through an operator UI 250.

Figure 8:
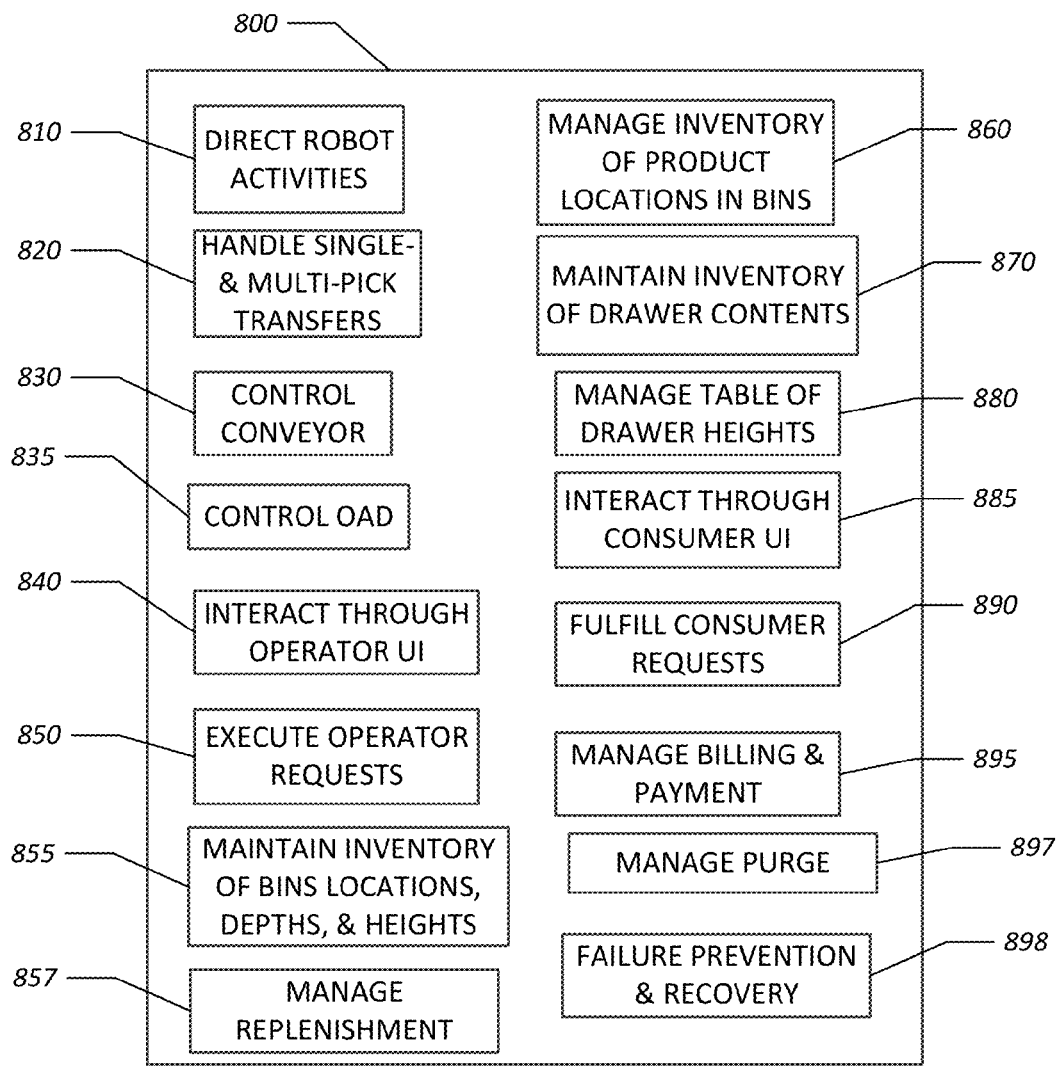
FIG. 8 is a block diagram illustrating exemplary tasks that might be executed by a controller of a RID.

FIG. 8 is a block diagram illustrating exemplary controller tasks 800 that might be executed by a controller 255 of an RID 200. These include: direct 810 activities of a robot 205; handle 820 single- and multi-pick transfers of product items 245; control 830 a conveyor 275; control 835 an OAD 280; interact 840 with an operator 120 through an operator UI 250; execute 850 requests from an operator 120; maintain 855 inventory of bins 230 locations, depths, and heights; manage 857 replenishment; manage 860 inventory of product item 245 locations in bins 230; maintain 870 inventory of drawer 240 contents an layouts; manage 880 a table of drawer 240 heights; interact 885 through a consumer UI 225; fulfill 890 requests or orders from a consumer 110; manage 895 billing and payment; manage 897 purge; and handle 898 failure prevention and recovery.

Figure 9:
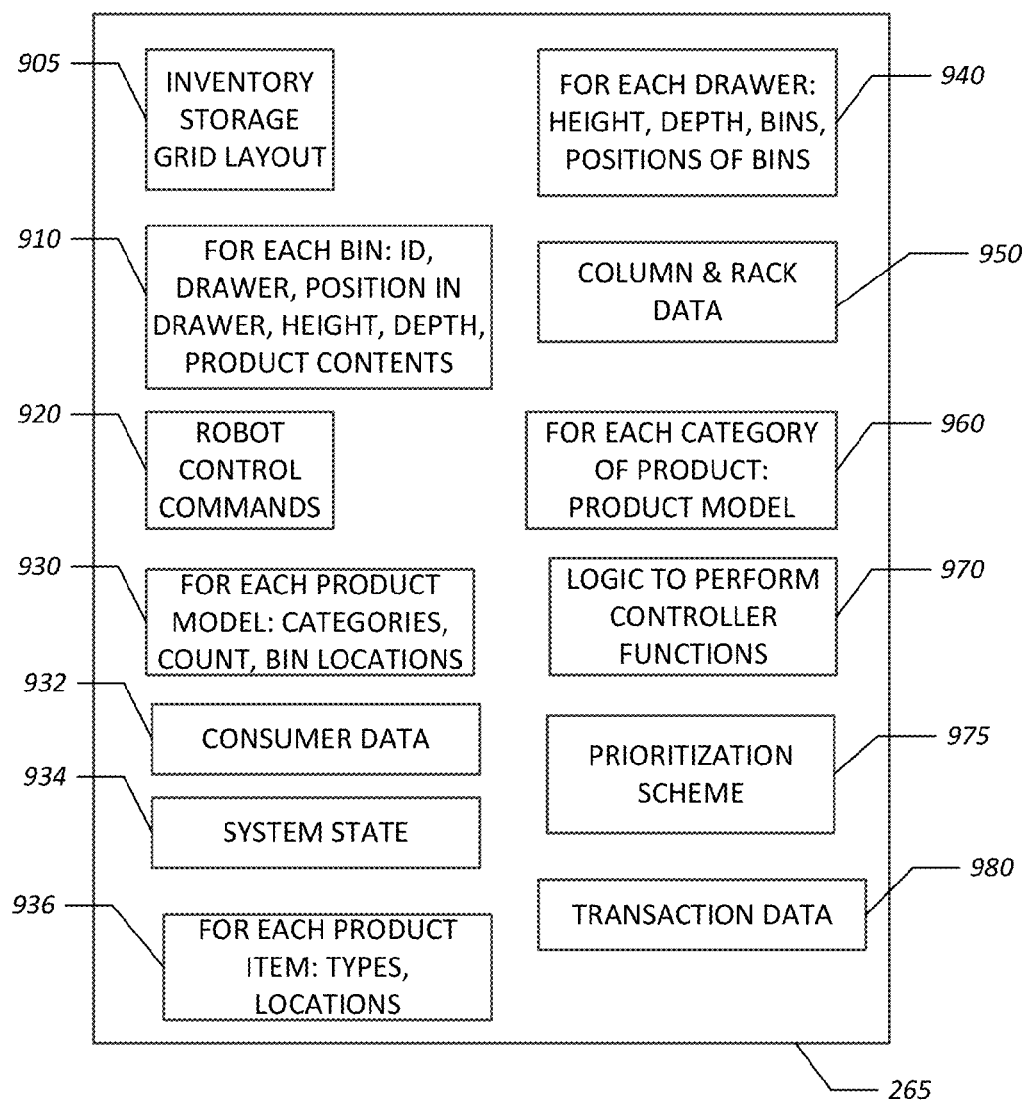
FIG. 9 is a block diagram illustrating exemplary types of data that might be maintained and managed by a controller of a RID within a database system.

FIG. 9 is a block diagram illustrating exemplary types of data in a database system 265 that might be maintained and managed by a controller 255 of an RID 200 in storage 730. Such data types include: ISU 210 grid layout 905; for each bin: id, drawer, position in drawer, height, depth, product contents 910; robot control commands 920; product model data 930, such as categories (e.g., digital camera), bin locations; data about consumers 932; system state data 934; product item data 934; drawer data 940—for each drawer: height, depth, bins, positions of bins; data about column and rack positions and content 950; for each category of product: product model 960; logic to perform controller functions 970; task prioritization schemes prioritization schemes 975; and data regarding transactions with customers 980.

FIGS. 10a and 10b are left side and front views, respectively, of a bin 230 containing a product item 245. The front view is a cross section at A-A through the side view. The front view shows that the bin 230 rests by means of two hangers 1050, which each straddle a respective rail 500 on either side of the bin 230. The rails 500 are part of a column 410 in the ISU 210.

Preferably the bin 230 will be transparent or translucent, so the product items 245 in the ISU 210 can be seen by consumers 110, by an operator 120, and by technicians for testing, upgrade, maintenance, and repair. In other embodiments, the bins 230 may be opaque. As mentioned previously, the means for identifying bins 230 may influence the choice between transparent and opaque bins 230.

We will call the z-dimension of a bin 230 its height; the y-dimension its depth; and the x-dimension its width. So FIG. 10a shows the height and depth of the bin 230; FIG. 10b shows its height and width.

The exemplary hangers 1050 shown in FIG. 10a might extend the full depth of the bin 230, but hangers 1050 might only extend a portion of that dimension, and may have two or more subcomponents. See, for example, FIG. 17, where the hangers 1050 are more similar to those of hanging file folders.

FIGS. 11a and 11b show another bin 230 hanging on two rails 500. The front view is a cross section at B-B through the side view. Comparison of these figures with the previous two illustrates that bins 230 might differ in height or depth, accommodating a broad product assortment, while reducing the amount of unused space within the ISU 210 relative to a system that uses equal height or equal depth bins 230 for all product items 245.

Figures 12A, 12B:
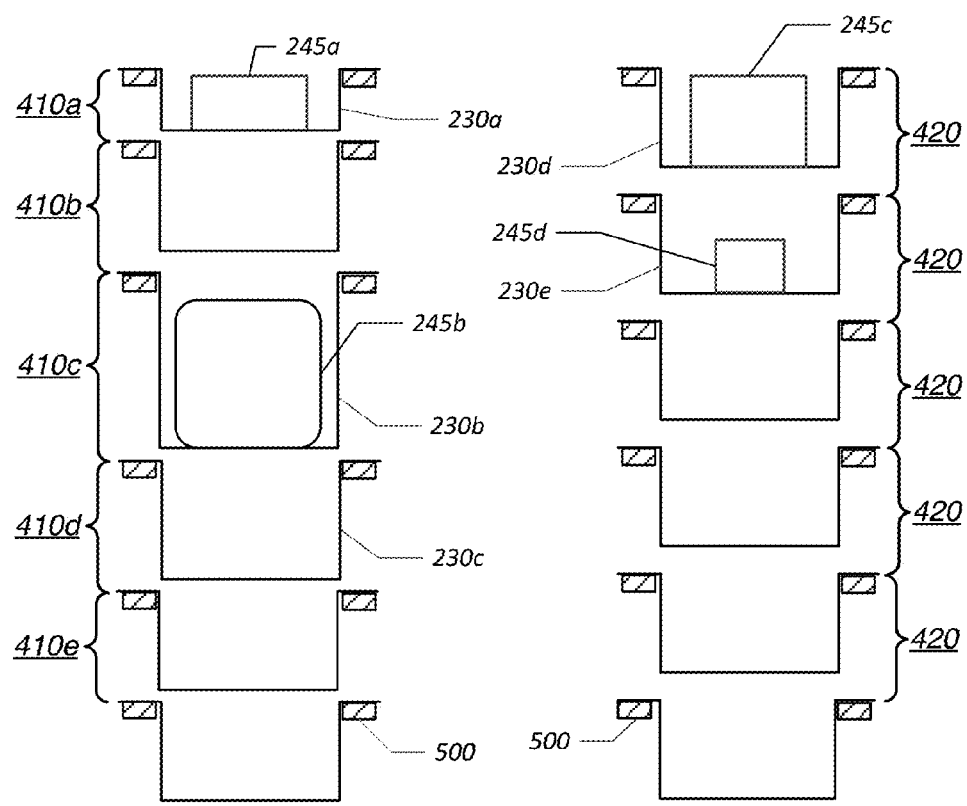
FIG. 12a is a front cross-sectional view through an exemplary column of rails and bins in an exemplary ISU, the rails positioned to form drawers that are variably-spaced in the vertical.
FIG. 12b is a front cross-sectional view through an exemplary column of rails and bins in an exemplary ISU, the rails positioned to allow drawers that are equally-spaced in the vertical.

FIG. 12a is a front cross-sectional view through a column 410 of rails 500 and bins 230 in an exemplary ISU 210; the rails 500 are positioned to form drawers 240 that are variably-spaced in the vertical, as indicated by distances 410a-410e. Bins 230a, 230b, and 230c are each of different heights; and bins 230a and 230b contain product items 245 of different heights, namely product items 245a and 245b.

FIG. 12b is comparable, but for equally-spaced rails 500 and drawers 240. The drawers 240 are separated vertically by a distance 420, say D. Fixed height bins, such as 230d and 230e, can hold product items 245 of different heights, such as product items 245c and 245d; overall, however, variable vertical spacing is preferable because it can reduce wasted space when the ISU 210 stores a variety of types of product items 245.

Figure 13A:
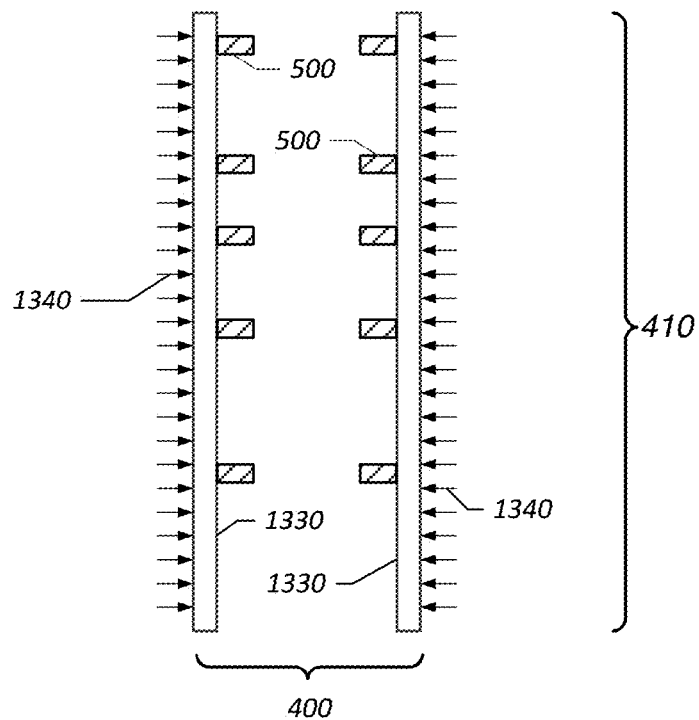
FIG. 13a illustrates how equally-spaced rail mount points might be used to implement variably-spaced racks in an exemplary ISU.

FIG. 13a illustrates how equally-spaced mount points 1340 (indicated by arrows) for variably-spaced racks 400 might be used to implement variably-spaced rails 500 in an exemplary ISU. Each rail 500 attaches to a post 1330 at a mount point 1340. The rails 500 and posts 1330 form a column 410 of drawers 240 for hanging bins 230 in the ISU 210. A fine spacing of the available mount points 1340 relative to the height of the smallest bin 230 provides flexibility in the height of drawers 240. The vertical positions of the rails 500 may be controlled and set automatically by the controller 255, possibly in response to a directive from an operator 120. In this case, the rails 500 may move vertically on tracks. Alternatively, in some embodiments, changes to positions of the rails 500 might require manual positioning.

Figure 13B:
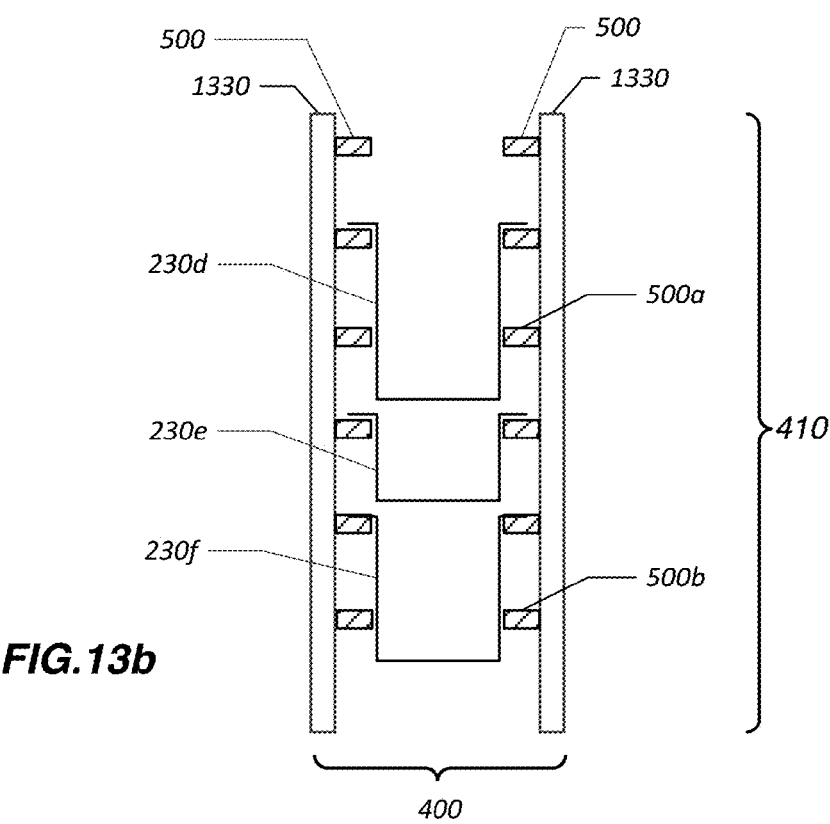
FIG. 13b illustrates how equally-spaced rails might be used to facilitate bins of varying height.

FIG. 13b illustrates how equally-spaced rails 500 might be used to facilitate bins 230 of varying height. Bins 230d and 230f are each taller than the fixed distance between rails 500, and overlap rails 500a and 500b, respectively. Bin 230e has a smaller height and fits between two vertically-adjacent rails 500. Switching between rail configurations might be initiated by an operator 120 through an operator UI 250. For example, an operator 120 might specify that all drawers 240 in column A will have height X, while those in column B will have height 2X. With the approach of FIG. 13b, bin height changes can be made by automatically by the system, or by an operator 120, without changing positions of rails 500. This approach is preferable to that of FIG. 13a in embodiments in which rails 500 of the ISU 210 would have to be repositioned manually.

Within a given region of the ISU 210 (e.g., within a column 410), the maximum height of a bin 230 might be set to be less than mD for some integer m greater than 1. In this area, some of the bins 230 may vertically overlap, or extend below, rails 500. This integer might be chosen for the region by logic of the controller 255 to conserve space in the RID, or it might set manually by an operator 120 through an operator UI 250.

Figure 14B:
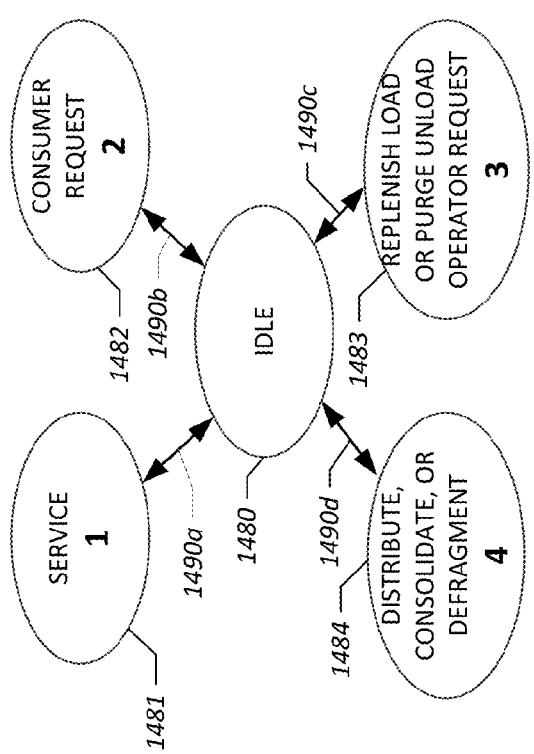
FIG. 14b is a state diagram illustrating an exemplary priority system for a RID.
Figure 14A:
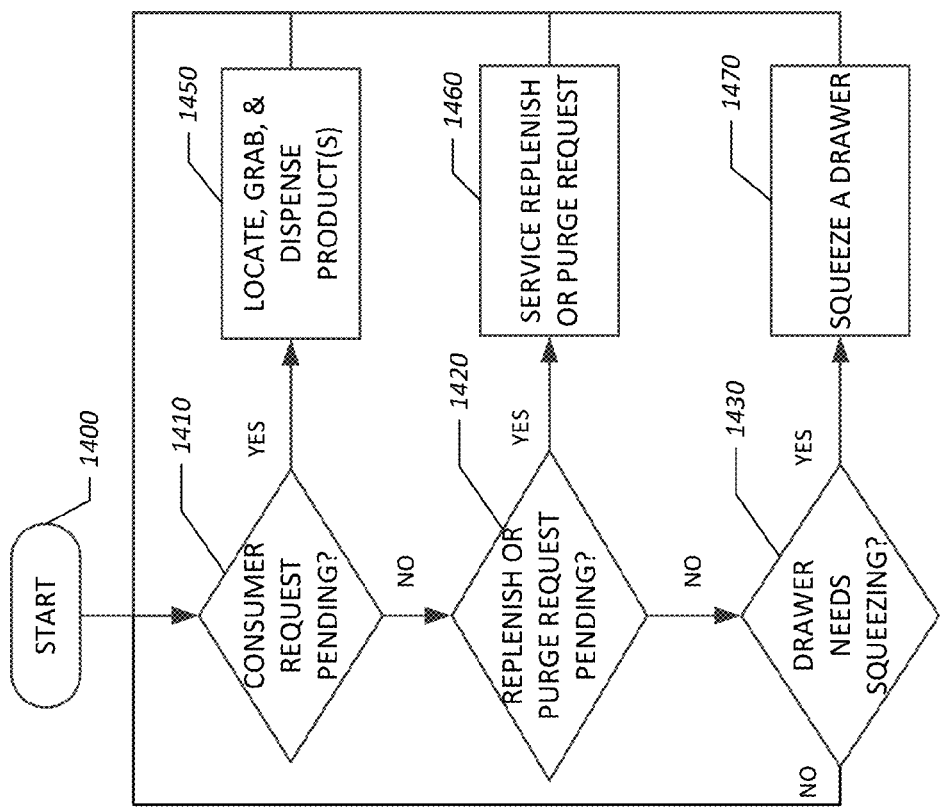
FIG. 14a is a flowchart illustrating how exemplary logic in a RID, typically executed by a controller, might prioritize tasks of fulfilling purchase requests; replenishment/purge tasks; and compression of drawers.

FIG. 14a is a flowchart illustrating how exemplary logic 260 in an RID 200, typically executed by a controller 255, might prioritize tasks of fulfilling purchase requests; replenishment/purge; and compression of drawers 240. The depicted process might continue indefinitely over an entire period when the RID 200 is operational. After the start 1400, the logic 260 checks whether 1410 there is a consumer 110 request pending. Preferably, fulfillment of consumer 110 requests will have the highest priority in the system. If so, the robot 205 may grab 1450 the appropriate bins 230 and dispense the product items 245 to the consumer 110. Otherwise, the logic 260 checks whether 1420 a replenish or purge request (or possibly some other request from the operator 120) is pending. If so, then the controller 255 services 1460 the request from the operator 120. Otherwise, in background, the robot 205 may squeeze 1470 or compress bins 230 in drawers 240 when needed 1430 to reduce any wasted space in the ISU 210. Note that in some embodiments, the robot 205 might perform compression at other times, such as when a new bin 230 is added to a drawer 240, or an existing bin 230 is removed. After completing a task, flow returns to step 1410.

FIG. 14b is a state diagram illustrating an alternative priority system for an exemplary RID 200. The diagram shows five states, namely: idle 1480; service 1481; customer request 1482; replenish load or purge unload operator request 1483; and distribute, consolidate, or defragment 1484. The RID 200 returns to idle 1480 after completing a task specified by any of the other states, as indicated by arrows 1490*a*-1490*d*. Ellipses representing states other than idle 1480 show with a boldface numeral how the corresponding tasks might be prioritized priority, with '1' being the highest priority. The load and unload requests from the operator 120 are initiated at the operator UI 250—a load-priority request when the operator 120 either needs empty bins 230 for new product items 245 or has completed filling some bins 230 with new product items 245; and an unload-priority request when the operator 120 requests that the RID 200 remove all instances of a given product type or requests that empty bins 230 be returned to the ISU 210. The distribute-, consolidate-, and defragment-priority tasks are done in background.

Figure 15:
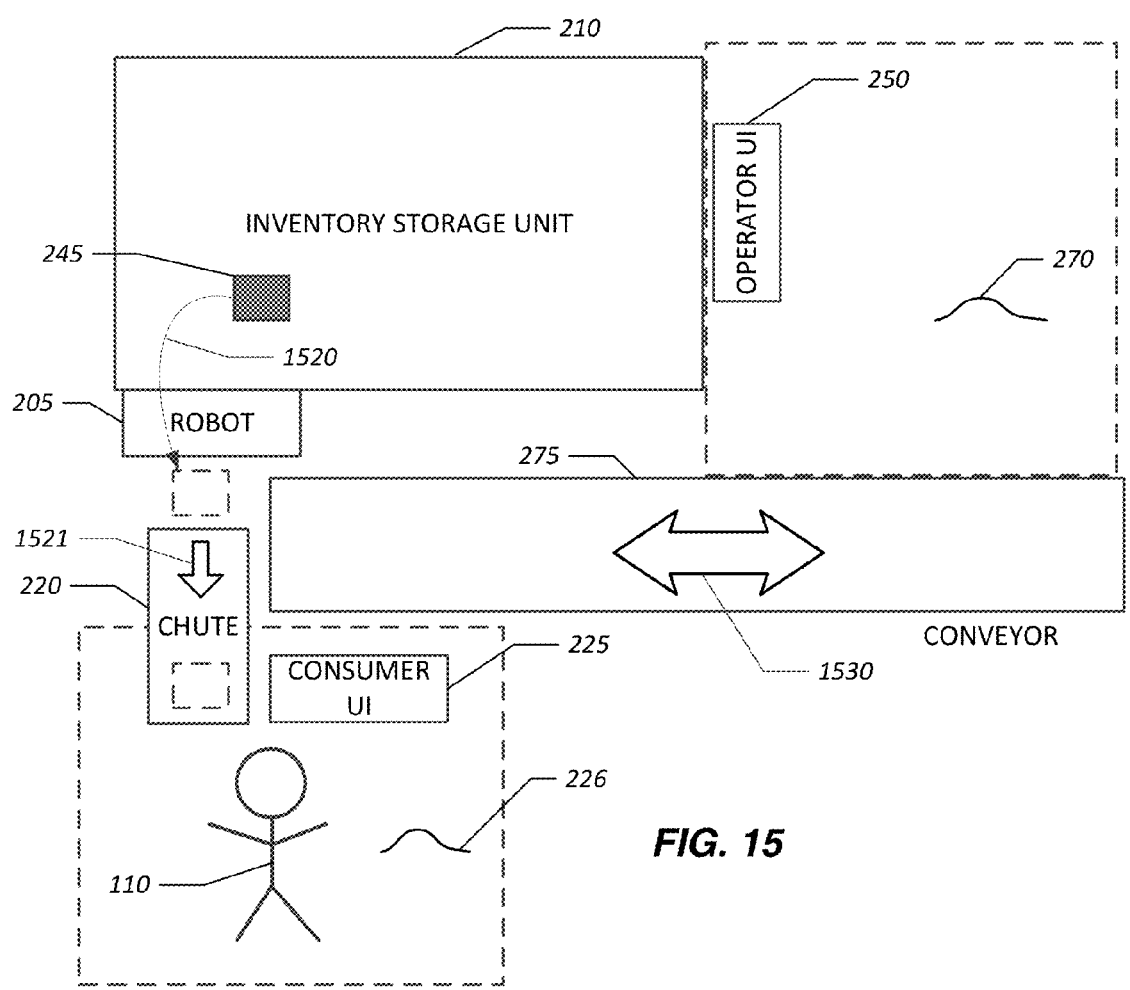
FIG. 15 is a conceptual diagram illustrating how an exemplary RID might fulfill a request from a consumer for one or more product items.

FIG. 15 is a conceptual diagram illustrating how an exemplary RID 200 might fulfill a request from a consumer 110 for one or more product items 245. As mentioned previously, the consumer 110 here might actually be a staff member 112 if, for example, the RID 200 picks product items 245 for shipping from a DC. The consumer 110 makes the request through a consumer UI 225, located in a consumer station 226. The robot 205 removes the product items 245 from the ISU 210, as indicated by arrow 1520 and, as indicated by arrow 1521, places them into a chute 220 or other dispensing means, thereby giving the consumer 110 access to product items 245. The RID 200 may also include an operator station 270, having an operator UI 250, and a conveyor 275 to move bins 230, whether empty or containing a product item 245, between the ISU 210 and the operator station 270, as indicated by arrow 1530.

Figure 16A:
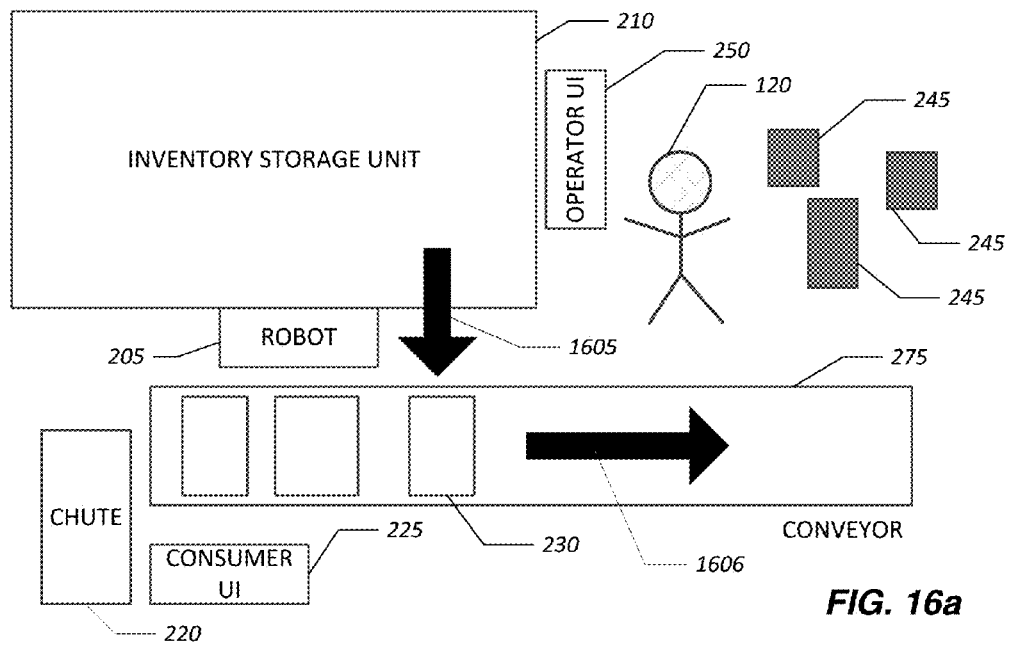
FIG. 16a is a conceptual diagram illustrating an exemplary RID transferring empty bins from an ISU to an operator station as part of a replenishment task.

FIG. 16*a* is a conceptual diagram illustrating an exemplary RID 200 transferring empty bins 230 from an ISU 210 to an operator station 270 as part of a replenishment task. The operator 120 may initiate or trigger the task by a request through the operator UI 250. In response, the controller 255 accesses in storage 730 a database system 265 to determine locations within the ISU 210 of a plurality of empty bins 230. In response to receiving a command from the controller 255, the robot 205 transfers the empties to the conveyor 275 as indicated by 1605. As indicated by 1606, the conveyor 275, in turn, moves the empty bins 230 to the operator station 270, where a number of new product items 245 await.

Figure 16B:
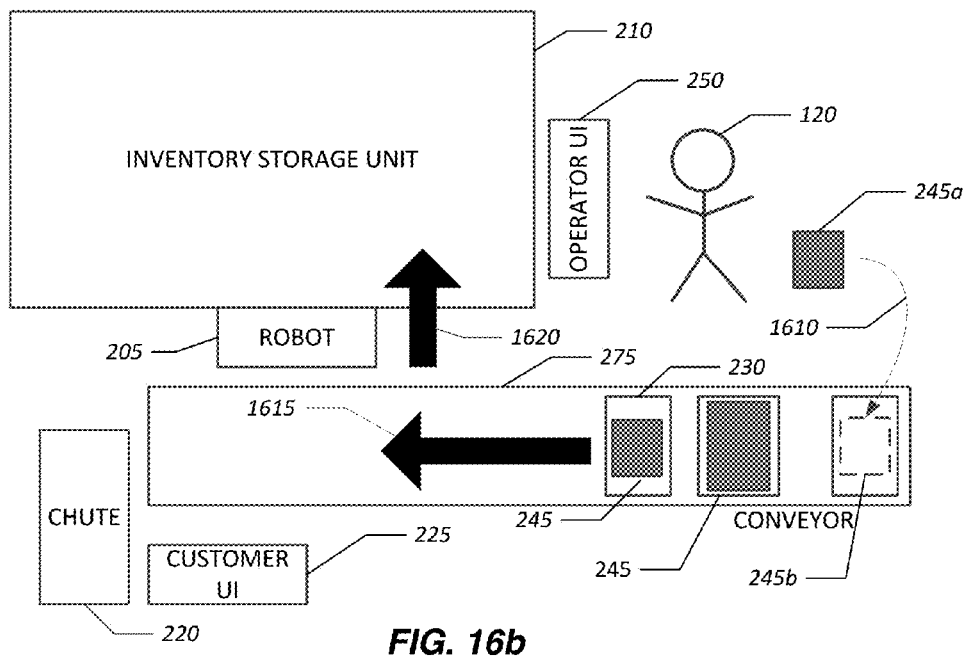
FIG. 16b is a conceptual diagram illustrating an exemplary RID transferring filled bins from an operator station to an ISU as part of a replenishment task.

FIG. 16*b* is a conceptual diagram illustrating an exemplary RID 200 transferring filled bins 230 from an operator station 270 to an ISU 210 as part of a replenishment task. The operator 120 fills the bins 230 with the product items 245, as indicated by arrow 1610. When finished filling, operator 120 might request through the operator UI 250 that the RID 200 continue the replenishment task. Upon receiving the request, the controller 255 causes the robot 205 to (1) move the bins 230 to be accessible to the robot 205—in the figure, this is by a conveyor 275, as indicated by arrow 1615, but it could be done alternatively by closing an OAD 280; (2) grab each bin 230 from the conveyor 275; and (3) transfer the filled bins 230 into the ISU 210, as indicated by arrow 1620. The location selected by the controller 255 might be chosen according to a prioritization scheme 975. A bin 230 might be initially placed into a temporary storage location, and later transferred by the robot 205 to another location that is chosen according to the prioritization scheme 975; this later transfer might be done in a background mode in order to avoid impacting higher priority tasks.

Figure 17:
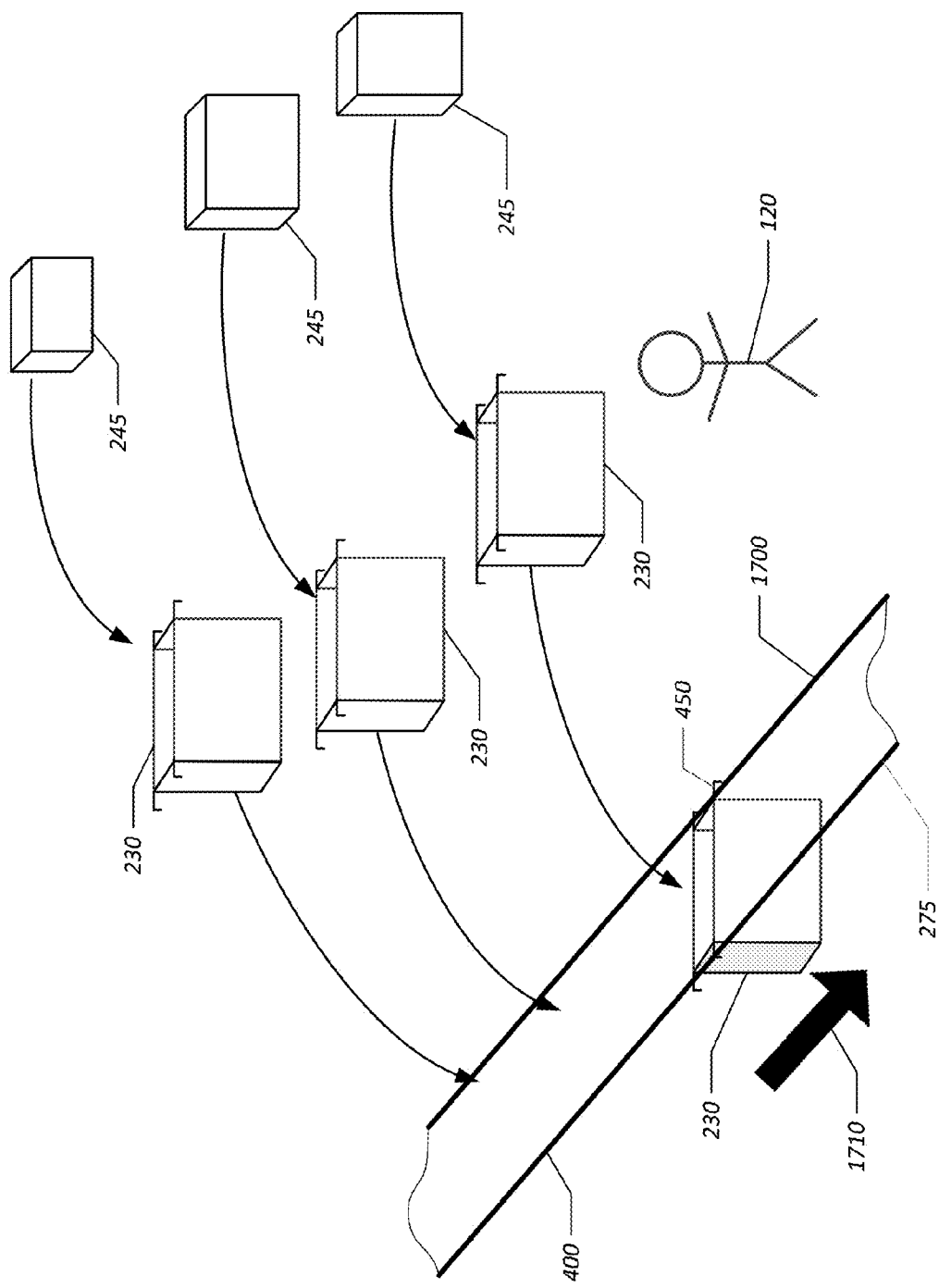
FIG. 17 is a conceptual diagram of replenishment in an exemplary RID.

FIG. 17 is a conceptual diagram illustrating bins 230 being filled by an operator 120 with product items 245, and placed on rails 1700 of a conveyor 275. As indicated by arrow 1710, conveyor 275 moves the filled bins 230 to where they can be accessed by robot 205.

Figure 18:
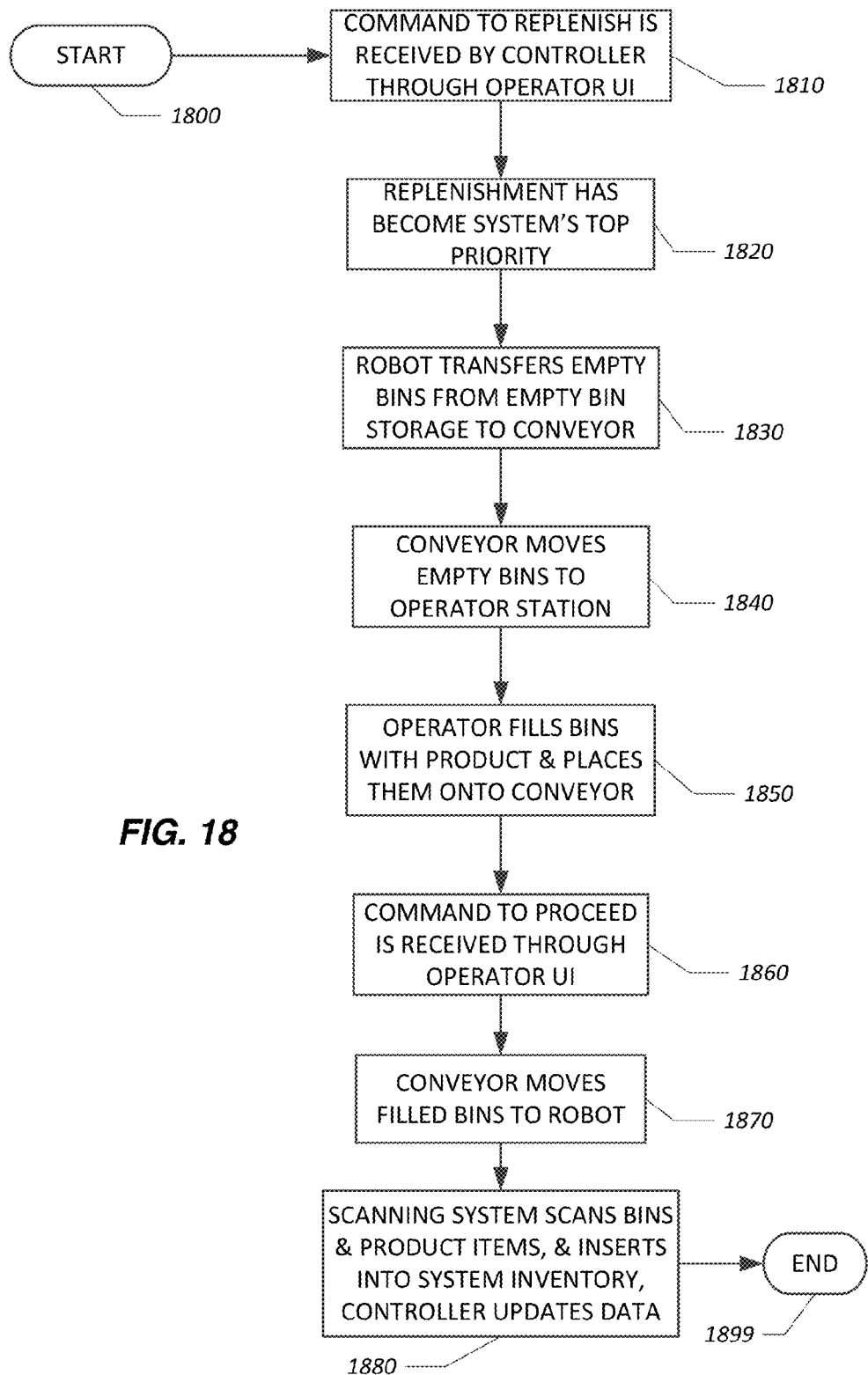
FIG. 18 is a flowchart illustrating a replenishment task in an exemplary RID.

FIG. 18 is a flowchart illustrating a replenishment task in an exemplary RID 200. After the start 1800, a signal to replenish is received 1810 through the operator UI 250. Replenishment might not start immediately if delayed according to system priorities. See, e.g., FIGS. 14*a* and 14*b*. Once replenishment has priority 1820, the robot 205 transfers 1830 empty bins 230 from empty bin storage 235 to conveyor 275, which then moves 1840 the bins 230 to operator station 270. The operator 120 fills 1850 the empty bins 230 with product items 245, and places the filled bins 230 onto the conveyor 275. Through the operator UI 250, operator 120 signals 1860 that the system continue with replenishment. The conveyor 275 moves 1870 the filled bins to be accessible by robot 205. The robot 205 scans 1880 the bins 230 and the product items 245 using a scanning system 215 to obtain their IDs. The robot 205 may lift the bin 230, and using its attenuation features, tilt or rotate the bin 230 in order to perform the scan of a UPC or other identifier on the product item 245. The controller 255 records the incoming product items 245 in storage 730. The process ends 1899.

A scanning system 215 may be mounted on the robot 205 or on the ISU 210. More than one scanning system 215 might be used to improve scanning speed by reducing the time required for the robot 205 to find the product item identifier, or to divide tasks. For example, one scanner might scan a bin identifier, and the other scanner might scan a product item identifier. If the product item identifier is a UPC or a 2D barcode, then the bins 230 should be mostly or wholly transparent or translucent. If the product identifier is a radio-frequency identification (RFID) chip, or other smart identifier, then opaque bins 230 will permit scanning. In any case, a scanning system 215 will be directly or indirectly under control of the controller 255.

Figure 19:
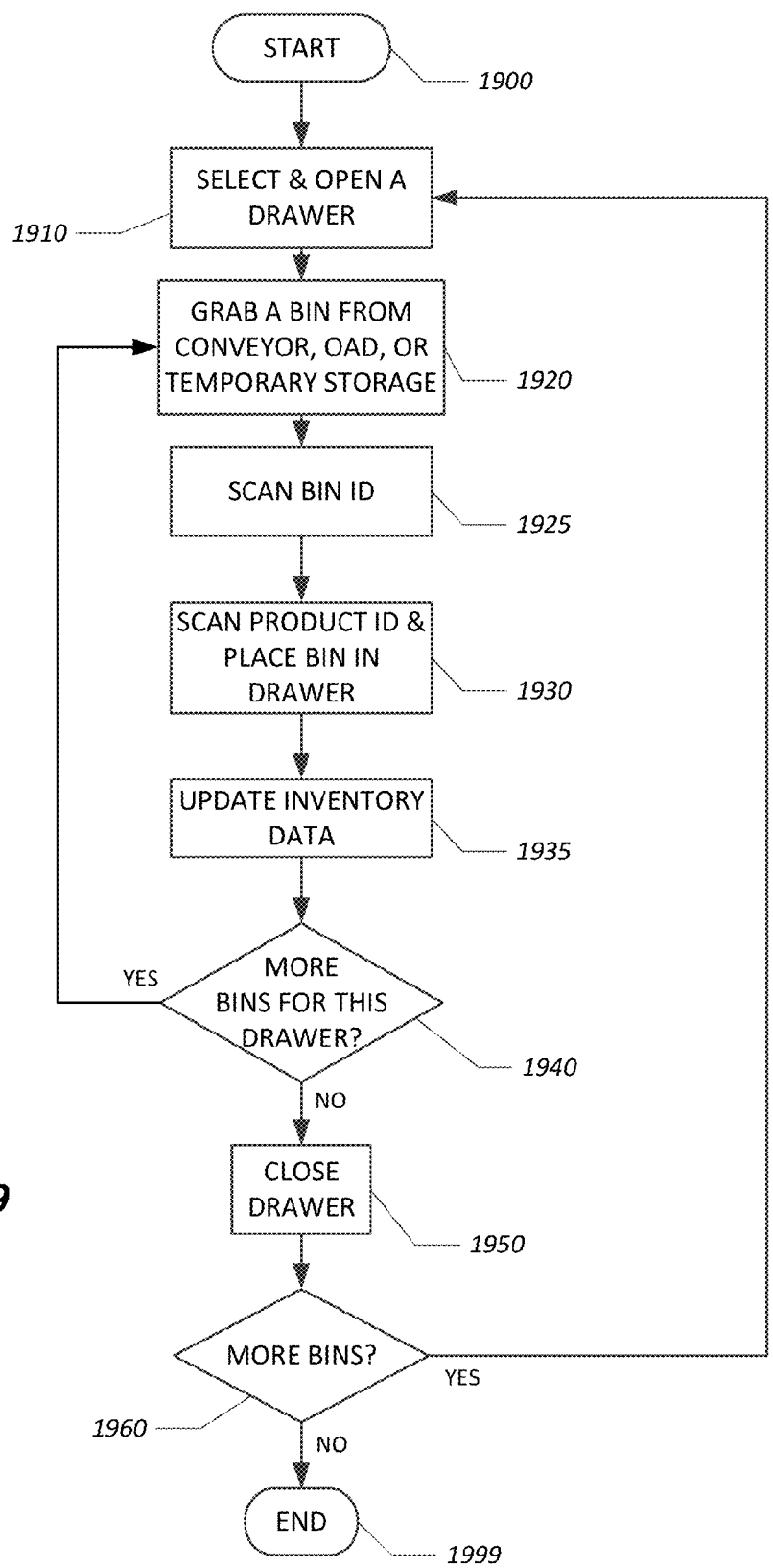
FIG. 19 is a flowchart illustrating aspects of a replenishment task in an exemplary RID.

FIG. 19 is a flowchart illustrating how step 1880 of FIG. 18 might be done. After the start 1900, the robot 205 selects and opens 1910 a drawer. The robot 205 grabs 1920 a bin 230 containing a product item 245 from either a conveyor 275, from an OAD 280, or from temporary storage, depending upon embodiment. The robot 205 scans 1925 the bin 230 to identify it. The robot 205 scans 1930 the product item 245 to obtain its product item identifier, and places the bin 230 into a drawer 240. The controller 255 updates 1935 the inventory data in the database system 265; in particular, the controller 255 associates the bin 230, the product item 245, and the particular location with the drawer 240. If 1940 there are more bins 230 ready to be placed into this drawer 240, then the process repeats from step 1920. Otherwise, the robot 205 closes 1950 the drawer 240. If 1960 there are more bins 230 to move to the ISU 210, then the process returns to step 1910. Otherwise, the process ends 1999.

Figure 20A:
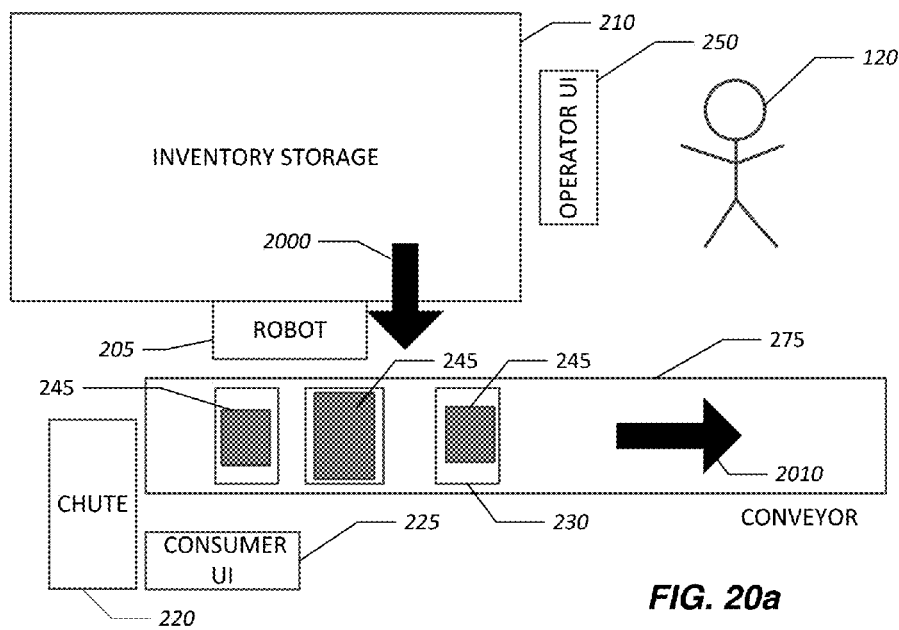
FIG. 20a is a conceptual diagram illustrating an exemplary RID transferring filled bins from an ISU to an operator station as part of a purge task.
Figure 20B:
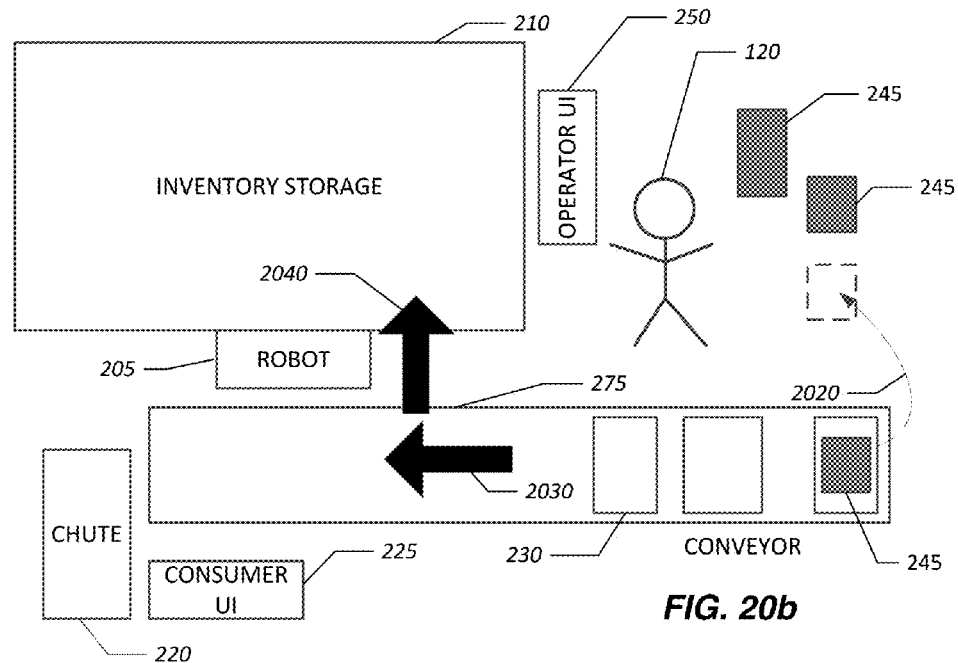
FIG. 20b is a conceptual diagram illustrating an exemplary RID transferring empty bins from an operator station to an ISU as part of a purge task.

FIG. 20*a* is a conceptual diagram illustrating an exemplary RID 200, in an embodiment with a conveyor 275, transferring filled bins from an ISU 210 to an operator station 270 as part of a purge task. The robot 205 moves bins 230 containing product items 245 to the conveyor 275, as indicated by arrow 2000. The conveyor 275 moves the bins 230 to the operator station 270, as indicated by arrow 2010. In FIG. 20*b*, the operator 120 removes the product items 245 from the bins 230, as indicated by arrow 2020. The empty bins 230 are carried by the conveyor 275, as indicated by arrow 2030. The robot 205 removes the empty bins 230 and returns them to the ISU 210, as indicated by arrow 2040, preferably to empty bin storage 235.

Note that FIG. 15-20*b* will apply, essentially unchanged, if the conveyor 275 is replaced with an OAD 280. This is illustrated by the following two figures, where we explicitly describe embodiments using an OAD 280 rather than a conveyor 275.

Figures 21A, 21B:
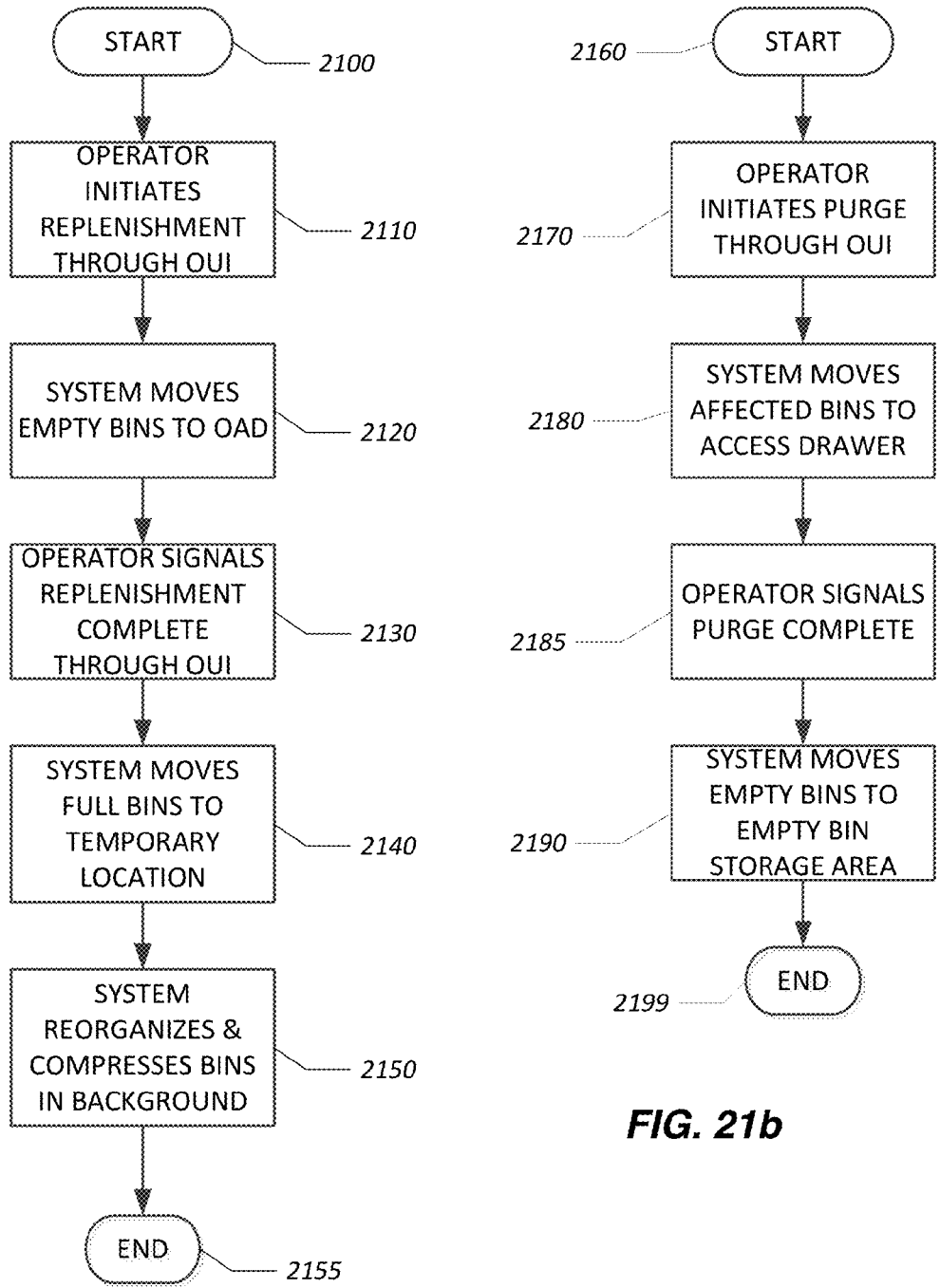
FIG. 21a is a flowchart illustrating replenishment in an exemplary RID using an OAD.
FIG. 21b is a flowchart illustrating purge in an exemplary RID using an OAD.

FIG. 21*a* is a flowchart illustrating replenishment in an exemplary RID 200 using an OAD 280. After the start 2100, an operator 120 initiates 2110 replenishment through the operator UI 250 with a command or signal to the controller 255. The system moves 2120 some empty bins 230 to an OAD 280. After filling empty bins 230 with product items 245, the operator 120 commands or signals 2130 through the operator UI 250 that the operator 120 portion of the replenishment task is complete. The RID 200 moves 2140 the empty bins 230 to a temporary location in the ISU 210. The RID 200 reorganizes 2150 the bins 230 into more permanent locations in the ISU 210, compressing drawers 240, either immediately or in background.

FIG. 21*b* is a flowchart illustrating purge in an exemplary RID 200 using an OAD 280. After the start 2160, an operator 120 initiates 2170 the purge operation through the operator UI 250, identifying one or more product items 245 or product types (see the Background section) to be purged. The RID 200 moves 2180 the affected bins 230 to the OAD 280. The operator 120 removes the product items 245 from the bins 230, and signals 2185 through the operator UI 250 that the operator 120 portion of the purge task is complete. The RID 200 moves 2190 the empty bins 230 to empty bin storage 235. The process ends 2199.

Figure 22A:
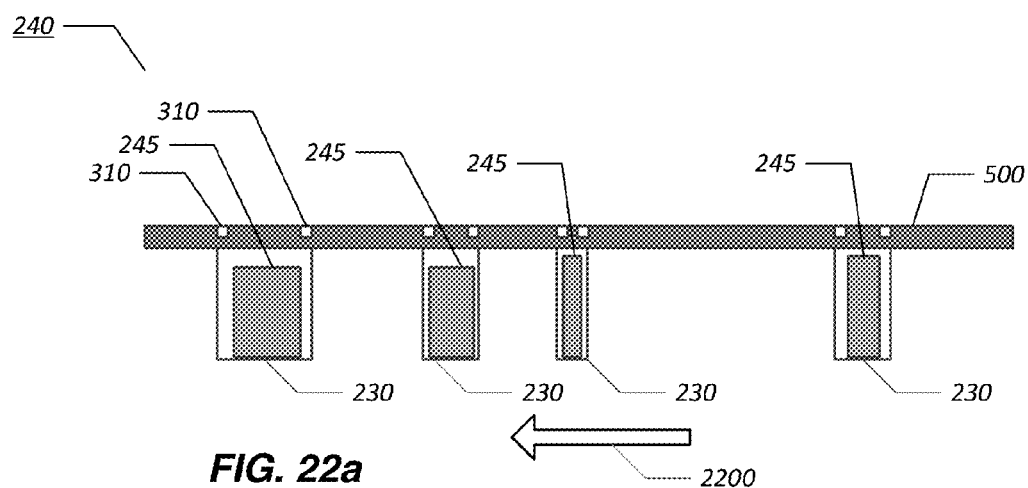
FIG. 22a illustrates a side view of a drawer in an exemplary ISU, before bin compression by a robot.
Figure 22B:
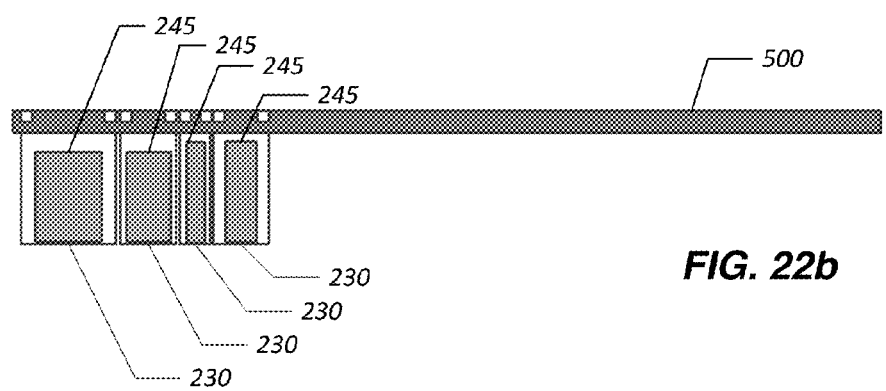
FIG. 22b illustrates a side view of a drawer in an exemplary ISU, after bin compression by a robot.

Compression might be done by the RID 200 on a bin-by-bin basis as bins 230 are added or removed. In some embodiments, however, compression might be done in whole or in part as a separate task, preferably in a background mode, without interfering with more important system tasks such as requests from a consumer 110 or an operator 120. FIGS. 22*a* and 22*b*, respectively, illustrate a side view of a drawer 240, before and after compression or squeezing by a robot 205. The direction of compression is indicated by arrow 2200.

Figure 23A:
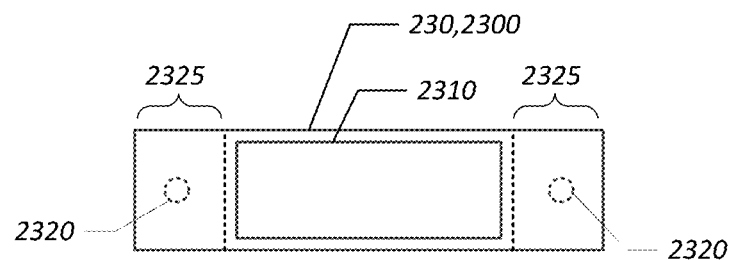
FIG. 23a is a top view of a pin-mounted bin.
Figure 23B:
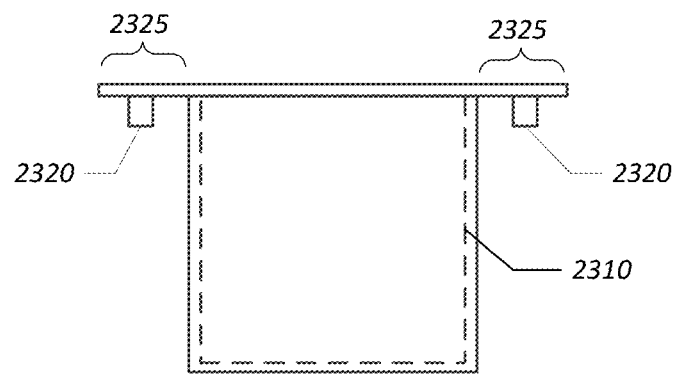
FIG. 23b is a front view of a pin-mounted bin.

An RID 200 might hang bins 230 in drawers 240 in various ways. For example, the bins 230 in FIGS. 10*a*, 10*b*, and 17 are suspended from hangers. We will refer to the portion of a bin 230 that overhangs a rail 500, from which the bin 230 is suspended, as a tab 2325. The bins 230 in FIG. 23*a*-24*e* hang instead secured by pins 2320 through the tabs 2325. The bins 230 shown are secured by a pair of pins 2320, one per side. Other embodiments might use two or more pins 2320 per side. FIGS. 23*a* and 23*b* are top and front views, respectively, of a pin-mounted bin 2300. The pins 2320 may be made of metal or other hard substance(s), such as a glass or a plastic. The walls of the bins 230 may be made of plastic, glass, acrylic, metal, or other rigid substance(s). FIG. 23*a* shows the interior wall 2310 of a bin 2300.

Figure 23C:
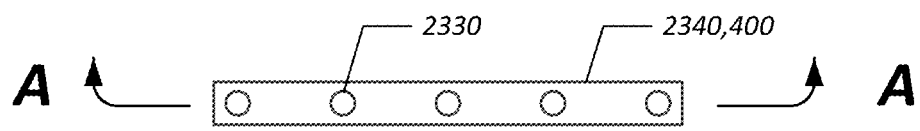
FIG. 23c is a top view of a rack for pin-mounted bins.

FIG. 23*c* is a top view of a rack 2340, a rack 400 to support one side of a bin 2300, which includes pin holes 2330 for the pins 2320. The pin holes 2330 are preferably spaced by a distance less than or equal to the depth of the narrowest bins 230. Those bins 230 with greater depths may overlap one or more pin holes 2330.

FIG. 24*a*-24*e* is a sequence of figures that illustrate an embodiment of compression by a platform 2410 of a drawer 240 of a bin 2300. Prior to the start of the sequence, the robot 205 has opened the drawer 240 by pulling on grip 2400. FIG. 24*a* shows four bins 2300, taken from the perspective of section A-A of FIG. 23*c*. Between FIGS. 24*a* and 24*b*, a bin 2300 has been removed by the robot 205.

A platform 2410 moves underneath the third and fourth bins 2300. The word "platform" does not necessarily imply a solid structure; platform 2410 might be a frame. A platform 2410 might be a component of a drawer 240 of the ISU 210, or a platform 2410 might be part of a tray 371 or a shelf 373.

In FIG. 24*c* the platform 2410 has lifted, as indicated by arrow 2420, two of the bins 2300, thereby disengaging their pins 2320 from the corresponding pin holes 2330 of rack 2340. In FIG. 24*c*, as indicated by arrow 2430, platform 2410 has moved the two bins 2300 left, so that their pins 2320 align with pin holes 2330 in the rack 2340. In FIG. 24*e*, as indicated by arrow 2440, the platform 2410 lowers to set the two bins 2300 into their compressed new location.

Figure 25:
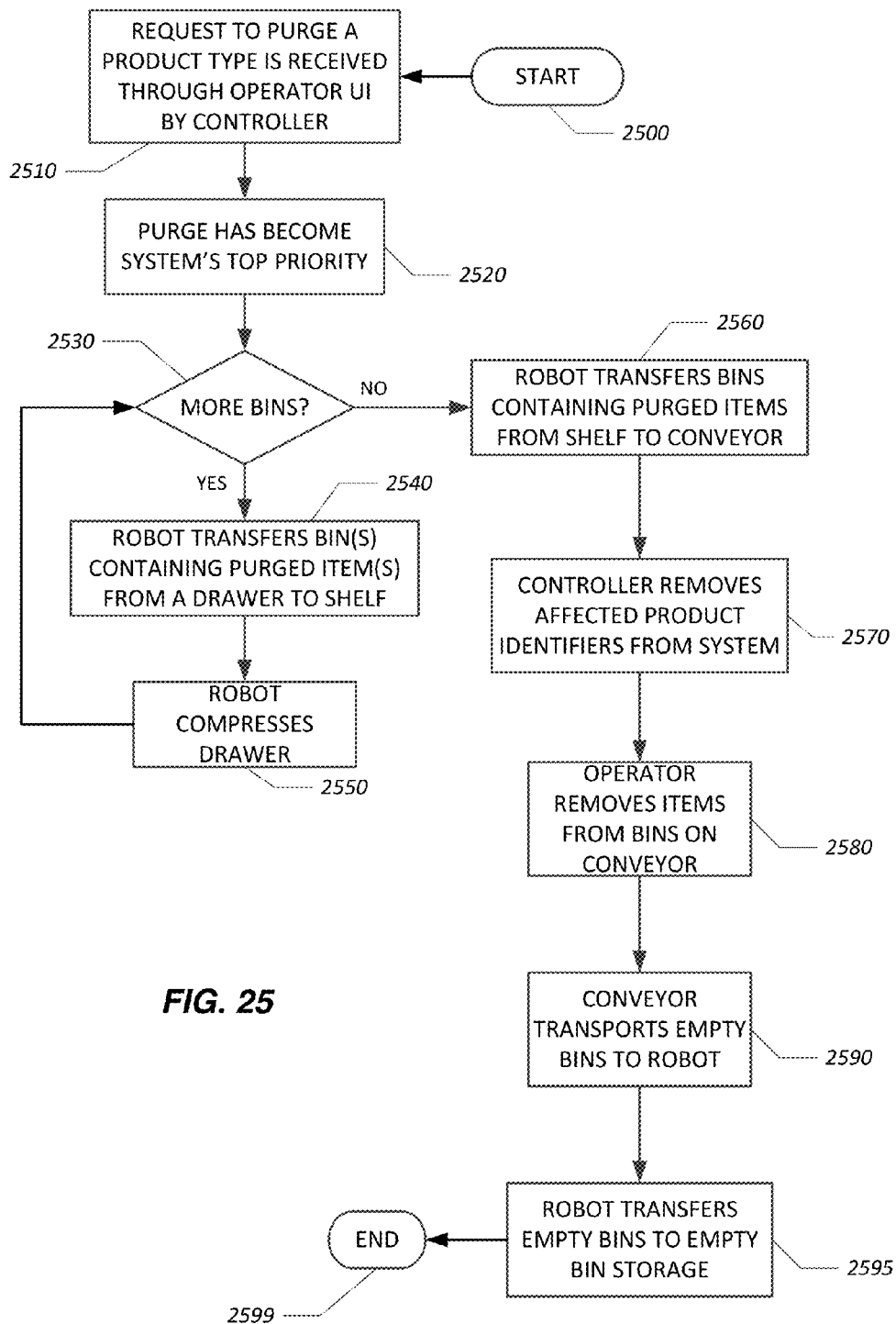
FIG. 25 is a flowchart illustrating a purge task in an exemplary RID.

FIG. 25 is a flowchart illustrating a purge task in an exemplary RID 200, using a conveyor 275. After the start 2500, the operator 120 enters 2510 a request to purge a product type through an operator UI 250. When 2520 the purge task has become the system's top priority and 2530 there are bins 230 yet to be purged, then, after opening a drawer 240, the robot 205 transfers 2540 one or more bins 230 from the drawer 240 to the shelf 373. In this embodiment, the robot 205 immediately compresses 2550 the drawer 240. If no more bins 230 remain to be purged, then the robot 205 moves 2560 the affected bins 230 from the shelf 373 to the conveyor 275. Alternatively, the robot 205 might move each bin 230, immediately after the bin 230 is located, from the shelf 373, or from the drawer 240 directly, to the conveyor 275. The controller 255 removes 2570 affected product items 245 from the database system 265. The conveyor 275 transports the bins 230 to the operator 120, who removes 2580 the product items 245 from the bins 230. The conveyor 275 transports 2590 the empty bins 230 back to the robot 205, which 2595 stores the empty bins 230 in empty bin storage 235. Here, as elsewhere, the controller 255 keeps track of which bins 230 are empty, and where each bin 230 is located. The process ends 2599.

Figure 26:
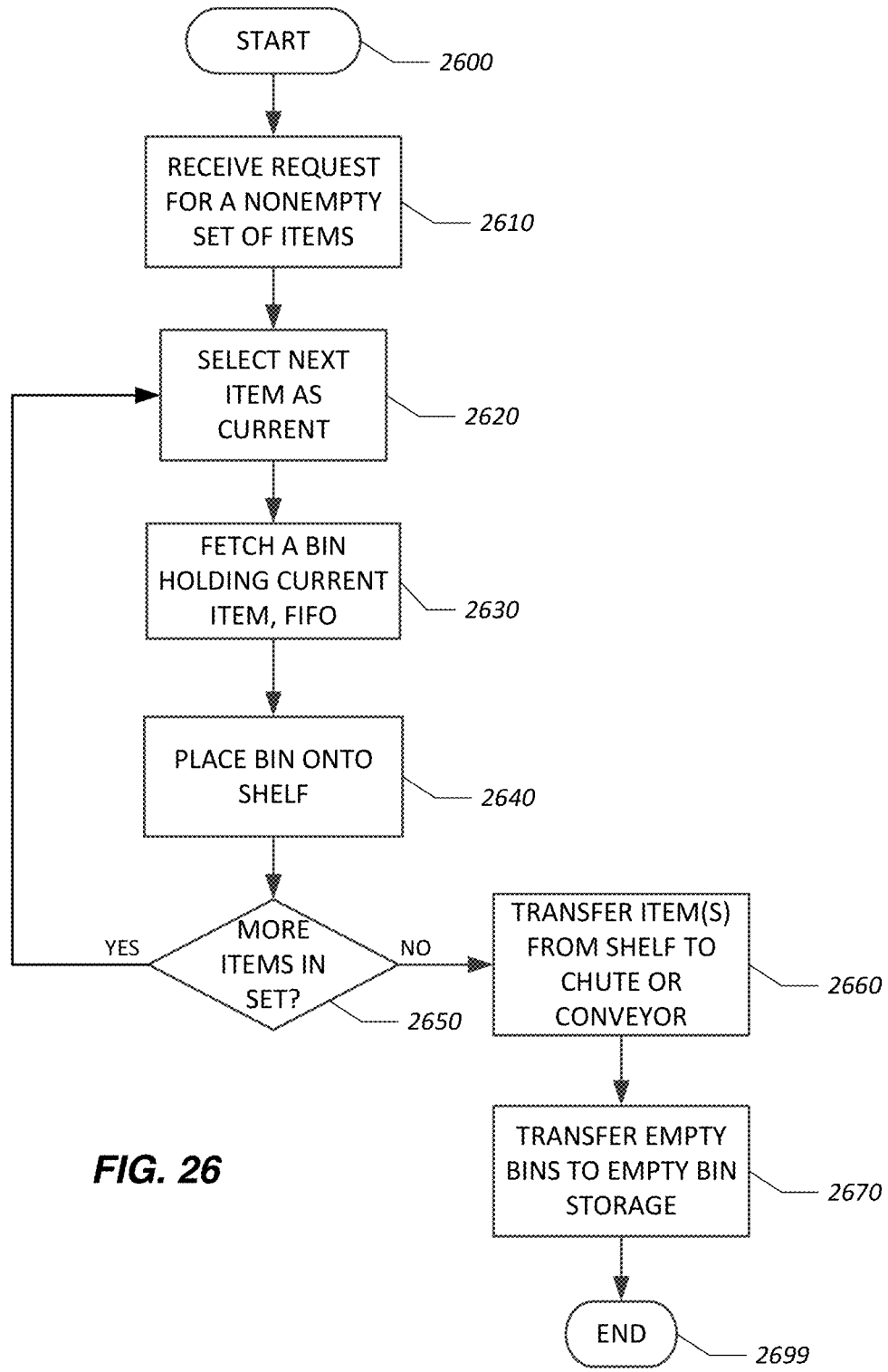
FIG. 26 is a flowchart illustrating multi-pick fulfillment in an exemplary RID.

FIG. 26 is a flowchart illustrating multi-pick fulfillment in an exemplary RID 200. In multi-pick fulfillment, the robot 205 grabs two or more bins 230 containing product items 245, holding them all temporarily before transferring them to the chute 220 or the conveyor 275. After the start 2600, a request is received 2610 for a nonempty set of product items 245, which might in some instances include two or more product items 245. The request might originate from an operator 120, a consumer 110, or other user 100. The next product item 245 becomes 2620 the current product item 245. The robot 205 fetches 2630 the bin 230 holding the current product item 245. The robot 205 places 2640 the current bin 230 onto the shelf 373. If 2650 there are more product items 245 in the set, the robot 205 transfers 2660 all the accumulated bins 230 containing to the conveyor 275 or, depending on the request, their product item 245 contents to the chute 220. Any empty bins 230 are transferred 2670 by the robot 205 to empty bin storage 235. The process ends 2699.

Figure 27:
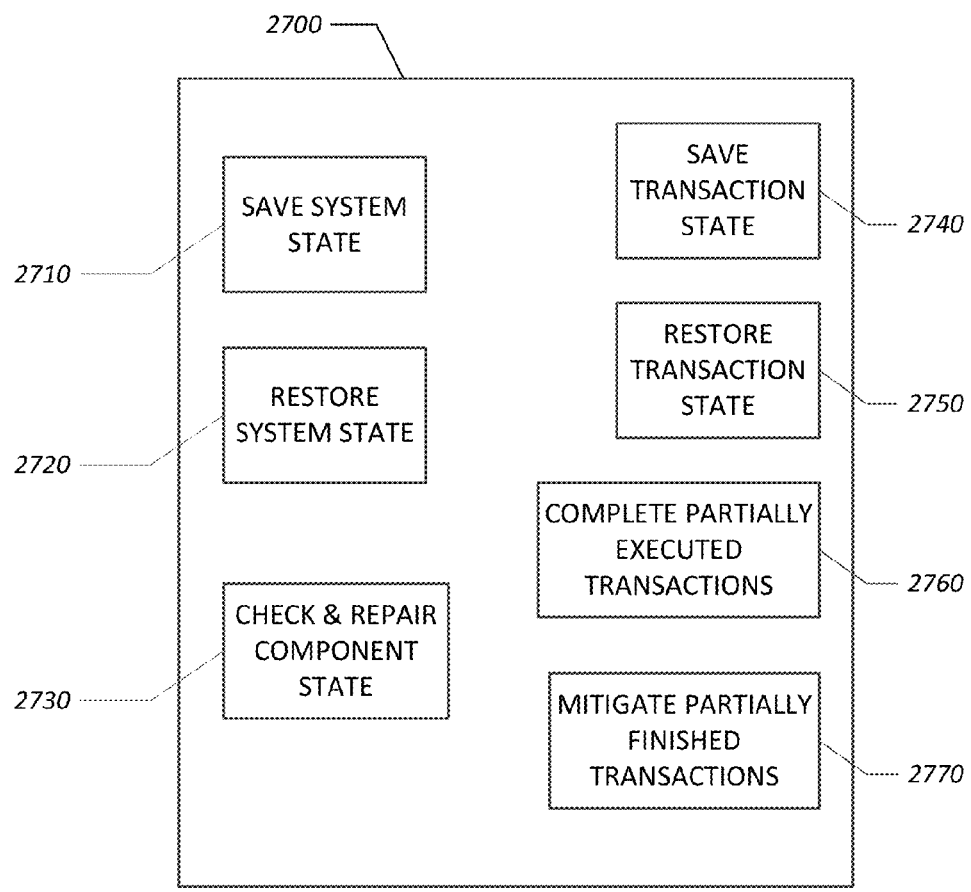
FIG. 27 is a block diagram illustrating controller tasks to recover from a system interruption or failure.

FIG. 27 is a block diagram illustrating controller 255 tasks 2700 to recover from a system interruption or failure. These include: save the system state 2710; restore the system state to where it was before failure 2720; check component state and repair any components if necessary 2730; save the state of any transactions, such as customer requests or purchases 2740; restore the state of transactions to the status before failure 2750; complete a transaction that has been partially completed, such as partially fulfilled 2760; and mitigate any partially completed transactions that cannot be fulfilled 2770 by, for example, a refund or a credit to a credit or debit card.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A method, comprising:
receiving, by a computerized controller of a processing system of a robotic inventory dispensary, through an operator user interface, a request that triggers a replenishment operation;
accessing, by the controller in computer-accessible tangible storage, a database system to determine locations within the robotic inventory dispensary of a plurality of bins that are empty;
receiving, by a robot of the robotic inventory dispensary, a command from the controller that causes the robot to transfer the plurality of bins to an operator-access device, wherein the bins are filled while located in the operator-access device;
receiving, by the controller through the operator user interface, a communication that indicates that the bins of the plurality of bins have been filled with a respective product item;
receiving, by the robot, a command from the controller that causes the robot to execute a set of actions for the replenishment operation, including for each filled bin of the plurality of bins:
removing the filled bin from the operator-access device; and
placing the filled bin into a respective bin location in the robotic inventory dispensary; and
for each filled bin of the plurality of bins, recording an identifier of the filled bin, an identifier of the respective product item, and an indication of the respective bin location in the database system.

2. The method of claim 1, the set of actions for the replenishment operation further including for each filled bin of the plurality of bins:
scanning the respective product item within the filled bin by a scanning system; and
obtaining a product item identifier from the scanning of the respective product item.

3. The method of claim 2, the set of actions for the replenishment operation further including for each filled bin of the plurality of bins:
scanning the filled bin by the scanning system; and
obtaining a bin identifier from the scanning of the filled bin.

4. The method of claim 1, further comprising:
utilizing a storage prioritization scheme, by the controller, to select the respective bin location for each filled bin, wherein the storage prioritization scheme is represented in tangible computer-accessible storage.

5. The method of claim 4, the set of actions for e replenishment operation further including for each filled bin of the plurality of bins:
before placing the filled bin in the respective bin location, transferring the bin to a temporary bin location; and
transferring the filled bin from the temporary bin location to the respective bin location in a background mode, whereby servicing requests from consumers to dispense product items from the robotic inventory dispensary has higher priority than transferring the filled bin from the temporary bin location.

6. The method of claim 5, wherein servicing requests from an operator has higher priority than transferring the filled bin from the temporary bin location, and wherein servicing requests from consumers to dispense product items has higher priority than servicing requests from the operator.

7. The method of claim 4, further comprising:
displaying, through the operator user interface, a listing of a plurality of storage prioritization schemes for the robot;
receiving, through the operator user interface, a selection of the storage prioritization scheme from the listing of the plurality of storage prioritization schemes; and
implementing the selection of the storage prioritization scheme by the controller.

8. The method of claim 4, further comprising;
displaying, through the operator user interface, a listing of a plurality of parameter variables constraining a current storage prioritization scheme for the robotic inventory dispensary;
receiving, through the operator user interface, a selection of a value of one of the plurality of parameter variables; and
implementing the selection of the value of one of he plurality of parameter variables by he controller.

9. The method of claim 1, further comprising:
maintaining by the controller within the database system:
data indicating a plurality of locations within the robotic inventory dispensary where bins can be stored;
data indicating, for each bin of the plurality of bins:
an identifier of the bin,
a location of the bin within the robotic inventory dispensary,
data by which the controller can determine whether the bin is empty or contains a product item, and
if the bin contains a product item, an identifier of the product item; and
data indicating, for each product item stored in the plurality of bins:
an identifier of the product item, and
an identifier of a bin containing the product item;
wherein the robot, under direction from the controller, can randomly access any location in the plurality of locations for bin extraction and for bin placement.

10. The method of claim 1, wherein the operator-access device is an operator access drawer into the robotic inventory dispensary.

11. The method of claim 10, wherein the operator access drawer provides access to a human operator for bin insertion and removal when the operator access drawer is open, and provides access to the robot for bin insertion and removal when the operator access drawer is closed.

12. The method of claim 1, wherein the operator-access device is a conveyor, and the method further comprising:
moving the plurality of bins that are empty to an operator-access area using the conveyor; and
moving the plurality of bins that are filled from the operator-access area to the robot using the conveyor.

13. A method, comprising;
receiving, by a computerized controller of a processing system of a robotic inventory dispensary, through an operator user interface, a request that includes a specification characterizing a set containing a plurality of product items and that triggers a purge operation;
accessing, by the controller in computer-accessible tangible storage, a database system to determine locations within the robotic inventory dispensary of a plurality of bins in the robotic inventory dispensary that correspond, one product item per bin, to the product items in the set of the plurality of product items, wherein the plurality of bins are filled with the product items;

receiving, by a robot of the robotic inventory dispensary:
identifiers of the locations of the filled bins in the plurality of bins, and
a command from the controller that causes the robot to transfer the filled bins in the plurality of bins to an operator-access device for emptying, wherein the filled bins are emptied while located in the operator-access device;

receiving, by the controller through the operator user interface, a communication that indicates that the plurality of bins have been emptied; and receiving, by the robot, a command from the controller that causes the robot to execute a set of actions, to complete the purge operation, including for each empty bin of the plurality of bins:
removing the empty bin from the operator-access device, and
placing the empty bin into a respective bin location in the robotic inventory dispensary.

14. The method of claim 13, the set of actions for the purge operation further including for each empty bin of the plurality of bins:
scanning the empty bin and obtaining a bin identifier from the scanning of the empty bin;
transmitting the bin identifier to the controller; and
receiving, from the controller, a location identifier of the respective bin location.

15. The method of claim 14, wherein the respective bin location indicates a section of the robotic inventory dispensary directed to storage of empty bins.

16. The method of claim 13, further comprising:
searching a database of the database system, by the controller, to identify the product items in the set of the plurality of product items.

17. The method of claim 16, wherein the specification characterizes all product items of a particular type.

18. The method of claim 16, wherein the specification characterizes all product items of a particular model.

19. The method of claim 16, wherein the specification characterizes all product items from a particular vendor or manufacturer.

20. The method of claim 13, further comprising:
rearranging, by the robot under control of the controller, respective bins to compress locations used to store the respective bins in the robotic inventory dispensary.

21. The method of claim 20, wherein the controller gives compression lower priority than responding to consumer and operator requests.

22. The method of claim 20, wherein the locations used to store the respective bins are provided from respective drawers, and wherein the robot compresses a respective drawer by coupling to and lifting a first bin in the respective drawer and moving the first bin closer to a second bin in the respective drawer.

23. The method of claim 20, wherein the locations used to store the respective bins are provided from respective drawers, and wherein the robot compresses a respective drawer by lifting a particular bin in the respective drawer using a platform or frame under the particular bin, and then translating the particular bin forward or backward within the respective drawer.

24. The method of claim 23, wherein the robot places the particular bin by aligning pins located in tabs of the particular bin with holes in a rail of the respective drawer.

25. The method of claim 13, wherein the operator-access device is an operator access drawer into the robotic inventory dispensary.

26. The method of claim 13, wherein he operator-access device is a conveyor, and the method further comprising:
moving the filled bins of the plurality of bins to an operator-access area using the conveyor; and
moving the emptied bins of the plurality of bins from the operator-access area to the robot using the conveyor.

* * * * *